United States Patent
Chung et al.

(10) Patent No.: US 11,187,928 B2
(45) Date of Patent: Nov. 30, 2021

(54) METHOD FOR DRIVING LIQUID CRYSTAL DISPLAY DEVICE CAPABLE OF SWITCHING BETWEEN WIDE VIEWING ANGLE AND NARROW VIEWING ANGLE

(71) Applicant: Infovision Optoelectronics (Kunshan) Co., LTD., Kunshan (CN)

(72) Inventors: Te-Chen Chung, Kunshan (CN); Chia-Te Liao, Kunshan (CN); Zifang Su, Kunshan (CN); Limei Jiang, Kunshan (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 162 days.

(21) Appl. No.: 16/626,265

(22) PCT Filed: Jul. 4, 2017

(86) PCT No.: PCT/CN2017/091723
§ 371 (c)(1),
(2) Date: Dec. 23, 2019

(87) PCT Pub. No.: WO2019/006665
PCT Pub. Date: Jan. 10, 2019

(65) Prior Publication Data
US 2020/0159050 A1  May 21, 2020

(51) Int. Cl.
*G02F 1/13* (2006.01)
*G02F 1/1343* (2006.01)

(52) U.S. Cl.
CPC ...... *G02F 1/1323* (2013.01); *G02F 1/134363* (2013.01); *G02F 2201/121* (2013.01)

(58) Field of Classification Search
None
See application file for complete search history.

(56) References Cited

U.S. PATENT DOCUMENTS

| | | | |
|---|---|---|---|
| 2002/0030782 A1 | 3/2002 | Lee | |
| 2014/0028937 A1* | 1/2014 | Uchida | G02F 1/134363 349/41 |

(Continued)

FOREIGN PATENT DOCUMENTS

| | | |
|---|---|---|
| CN | 101097316 A | 1/2008 |
| CN | 101211032 A | 7/2008 |

(Continued)

*Primary Examiner* — Amare Mengistu
*Assistant Examiner* — Sarvesh J Nadkarni
(74) *Attorney, Agent, or Firm* — Cheng-Ju Chiang

(57) ABSTRACT

A method for driving a liquid crystal display device capable of switching between a wide viewing angle and a narrow viewing angle. In a first viewing angle mode, a direct-current common voltage is applied to a common electrode and voltage signals are applied to a first bias electrode and a second bias electrode. In a second viewing angle mode, a direct-current common voltage is applied to the common electrode, a first alternating-current voltage is applied to the first bias electrode and a second alternating-current voltage is applied to the second bias electrode. In addition, in the second viewing angle mode, pixel units covered by each first electrode strip of the first bias electrode have alternating positive and negative polarities, and pixel units covered by each second electrode strip of the second bias electrode have alternating positive and negative polarities.

17 Claims, 27 Drawing Sheets

(56) References Cited

U.S. PATENT DOCUMENTS

| | | | | |
|---|---|---|---|---|
| 2014/0184965 A1* | 7/2014 | Xu | ................... | G02F 1/134363 |
| | | | | 349/33 |
| 2014/0240651 A1* | 8/2014 | Yoshioka | .......... | G02F 1/133707 |
| | | | | 349/141 |
| 2017/0242305 A1* | 8/2017 | Liao | .................. | G02F 1/133345 |

FOREIGN PATENT DOCUMENTS

| | | |
|---|---|---|
| CN | 101329465 A | 12/2008 |
| CN | 102854670 A | 1/2013 |
| CN | 104298020 A | 1/2015 |
| CN | 104317097 A | 1/2015 |
| CN | 104932167 A | 9/2015 |
| CN | 105652532 A | 6/2016 |
| CN | 205301759 U | 6/2016 |
| CN | 105807511 A | 7/2016 |
| CN | 105807512 A | 7/2016 |
| CN | 106292090 A | 1/2017 |
| CN | 106353938 A | 1/2017 |
| CN | 106646936 A | 5/2017 |
| KR | 10-2005-0039981 A | 5/2005 |
| KR | 10-2008-0051536 A | 6/2008 |

\* cited by examiner

METHOD FOR DRIVING LIQUID CRYSTAL DISPLAY DEVICE CAPABLE OF SWITCHING BETWEEN WIDE VIEWING ANGLE AND NARROW VIEWING ANGLE

CROSS REFERENCE TO RELATED APPLICATIONS

This application is a 35 U.S.C. § 371 National Phase conversion of International (PCT) Patent Application No. PCT/CN2017/091723, filed on Jul. 4, 2017. The PCT International Patent Application was filed and published in Chinese.

TECHNICAL FIELD

The present application relates to the technical field of liquid crystal display, and more particularly to a method for driving a liquid crystal display device capable of switching between a wide viewing angle and a narrow viewing angle.

BACKGROUND OF THE INVENTION

Liquid crystal display (LCD) has the advantages of good image quality, small size, light weight, low driving voltage, low power consumption, no radiation and relatively low manufacturing cost, and is dominant in the field of flat panel display.

Nowadays, the liquid crystal display devices are gradually developing towards wide viewing angle, whether it is applied in a mobile phone, a desktop display or a notebook computer, but in addition to the demand for wide viewing angle, in many occasions, the display device needs to have the function of switching between a wide viewing angle and a narrow viewing angle.

The current switching between wide viewing angle and narrow viewing angle are generally realized by the shielding function of a louver shielding film, which requires an additional shielding film outside the display device and is inconvenient to use.

Recently, the industry has also proposed to apply a vertical electric field to liquid crystal molecules by using a viewing angle control electrode on the side of a color filter substrate (CF) to achieve the switching between wide and narrow viewing angles. Referring to FIG. 1 and FIG. 2, the liquid crystal display device includes an upper substrate 11, a lower substrate 12, and a liquid crystal layer 13 between the upper substrate 11 and the lower substrate 12. The upper substrate 11 is provided with a viewing angle control electrode 111. As shown in FIG. 1, in the wide viewing angle display, the viewing angle control electrode 111 on the upper substrate 11 is not applied with a voltage, and the liquid crystal display device realizes a wide viewing angle display. As shown in FIG. 2, when a narrow viewing angle display is required, the viewing angle control electrode 111 on the upper substrate 11 is applied with a voltage, and the liquid crystal molecules in the liquid crystal layer 13 are tilted due to the vertical electric field E (as shown by arrows in the figure), so that the liquid crystal display device has a reduced contrast due to light leakage, and finally achieves a narrow viewing angle.

However, in the existing switching between wide and narrow viewing angles, the viewing angle control electrode is a transparent conductive electrode, and the transparent conductive electrode has a large resistance, so the viewing angle control electrode faces a large impedance and load during signal transmission, resulting in distortion of voltage waveform transmitted on the viewing angle control electrode. The waveform distortion will cause different voltage differences between the viewing angle control electrode and corresponding pixel electrode and common electrode. If the viewing angle control electrode adopts a patterned electrode strip structure, and the respective electrode strips are arranged in a horizontal direction or a vertical direction, the voltage difference between the electrode strips in the row or column directions and the pixel electrode and the common electrode in the entire screen will cause the entire column or the entire row to appear bright or dark, resulting in vertical or horizontal faint lines in the narrow viewing angle mode.

SUMMARY OF THE INVENTION

In view of the above, an object of the present application is to provide a method for driving a liquid crystal display device capable of switching between a wide viewing angle and a narrow viewing angle, to realize switching between the two modes of wide and narrow viewing angles, and at the same time solve the problem of vertical or horizontal dark lines which occur in the prior art.

The present application provides a driving method for a liquid crystal display device capable of switching between a wide viewing angle and a narrow viewing angle. The liquid crystal display device includes a lower substrate, an upper substrate and a liquid crystal layer between the lower substrate and the upper substrate. The lower substrate is provided with scanning lines, data lines, pixel electrodes and a common electrode. A plurality of scanning lines and a plurality of data lines are insulated from each other to define a plurality of pixel units on the lower substrate. The upper substrate is provided with a first bias electrode and a second bias electrode. The first bias electrode includes a plurality of first electrode strips electrically connected together. The second bias electrode includes a plurality of second electrode strips electrically connected together. The plurality of first electrode strips and the plurality of second electrode strips are mutually inserted with each other. The driving method includes:

in a first viewing angle mode, applying a direct-current common voltage to the common electrode, outputting driving voltages to the pixel units to achieve display of different gray scales through different voltage values, and applying a voltage signal to each of the first bias electrode and the second bias electrode such that the voltage differences between the first bias electrode and the common electrode, and between the second bias electrode and the common electrode are both less than a preset value;

in a second viewing angle mode, applying a direct-current common voltage to the common electrode, outputting driving voltages to the pixel units to achieve display of different gray scales through different voltage values, applying a first alternating-current voltage to the first bias electrode, and applying a second alternating-current voltage to the second bias electrode such that the voltage differences between the first bias electrode and the common electrode, and between the second bias electrode and the common electrode are both greater than the preset value;

wherein in the second viewing angle mode, the pixel units covered by each first electrode strip of the first bias electrode have alternating positive and negative polarities, and the pixel units covered by each second electrode strip also have alternating positive and negative polarities.

Further, the plurality of first electrode strips and the plurality of second electrode strips all extend in a horizontal direction; and in the second viewing angle mode, the polarity of the driving voltages outputted to the pixel units adopts column inversion.

Further, the plurality of first electrode strips and the plurality of second electrode strips all extend in a vertical direction; and in the second viewing angle mode, the polarity of the driving voltages outputted to the pixel units adopts row inversion.

Further, in the second viewing angle mode, the first alternating-current voltage applied to the first bias electrode and the second alternating-current voltage applied to the second bias electrode have opposite polarities relative to the direct-current common voltage of the common electrode.

Further, in the second viewing angle mode, the first alternating-current voltage applied to the first bias electrode and the second alternating-current voltage applied to the second bias electrode are both square waves, and are in a mirrored relationship relative to the direct-current common voltage of the common electrode.

Further, the plurality of first electrode strips and the plurality of second electrode strips all extend in a horizontal direction or in a vertical direction; and in the second viewing angle mode, the polarity of the driving voltages outputted to the pixel units adopts dot inversion.

Further, in the second viewing angle mode, the first alternating-current voltage applied to the first bias electrode and the second alternating-current voltage applied to the second bias electrode have the same polarity relative to the direct-current common voltage of the common electrode.

Further, in the second viewing angle mode, the first alternating-current voltage applied to the first bias electrode and the second alternating-current voltage applied to the second bias electrode are both square waves and have the same waveform.

Further, in the second viewing angle mode, the frequency of the first alternating-current voltage applied to the first bias electrode and the frequency of the second alternating-current voltage applied to the second bias electrode are both $\frac{1}{2}$ of the frame rate of the liquid crystal display device, and the polarity of the driving voltage outputted to each pixel unit is inverted once every two frames.

Further, in the second viewing angle mode, the frequency of the first alternating-current voltage applied to the first bias electrode and the frequency of the second alternating-current voltage applied to the second bias electrode are both $\frac{1}{4}$ of the frame rate of the liquid crystal display device, and the polarity of the driving voltage outputted to each pixel unit is inverted once every frame or every four frames.

Further, in the first viewing angle mode, the voltage signal applied to each of the first bias electrode and the second bias electrode is a direct-current voltage signal identical to the direct-current common voltage of the common electrode, such that the voltage differences between the first bias electrode and the common electrode, and between the second bias electrode and the common electrode are each zero.

Further, the liquid crystal layer adopts positive liquid crystal molecules, the first viewing angle mode is a wide viewing angle mode, and the second viewing angle mode is a narrow viewing angle mode.

Further, the liquid crystal layer adopts negative liquid crystal molecules, the first viewing angle mode is a narrow viewing angle mode, and the second viewing angle mode is a wide viewing angle mode.

Further, the upper substrate is further provided with a plurality of first metal strips and a plurality of second metal strips. The plurality of first metal strips are parallel to the plurality of first electrode strips and electrically connected to the plurality of first electrode strips, respectively. The plurality of second metal strips are parallel to the plurality of second electrode strips and electrically connected to the plurality of second electrode strips, respectively.

Further, the liquid crystal display device is provided with a switch button for switching different viewing angle modes of the liquid crystal display device.

The driving method provided in the embodiments of the present application can realize the switching between wide and narrow viewing angles by the arrangement of bias electrodes in the upper substrate and by applying voltage signals to the bias electrodes, and further by the inversion driving of the lower substrate, so as to solve the problem of vertical or horizontal dark lines existing in the prior art and improve the display quality of the display device.

DETAILED DESCRIPTION OF PREFERRED EMBODIMENTS

In order to make the objects, technical solutions and advantages of the present application much clear, embodiments of the present application will be further described with reference to the accompanying drawings.

The present application provides a driving method for a liquid crystal display device capable of switching between wide and narrow viewing angles, which can realize the switching between wide and narrow viewing angles by the arrangement of bias electrodes in the upper substrate and by applying voltage signals to the bias electrodes, and further by the inversion driving of the lower substrate, so as to solve the problem of vertical or horizontal dark lines existing in the prior art and improve the display quality of the display device.

First Embodiment

Figure 1:
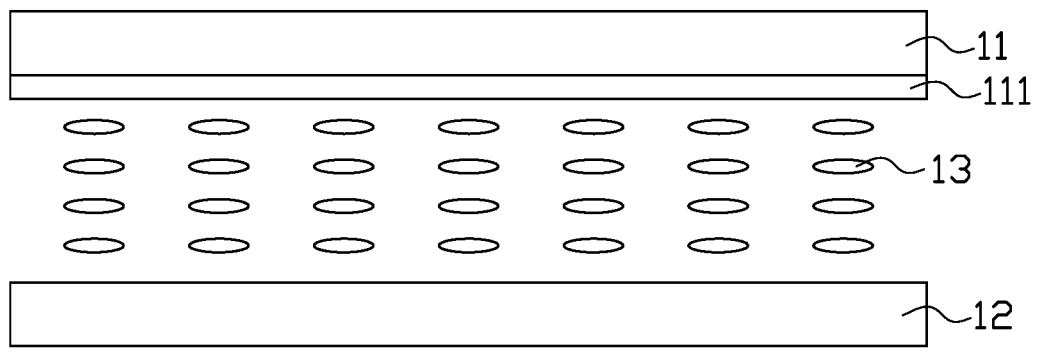
FIG. 1 is a partial cross-sectional view showing a conventional liquid crystal display device in a wide viewing angle.
Figure 2:
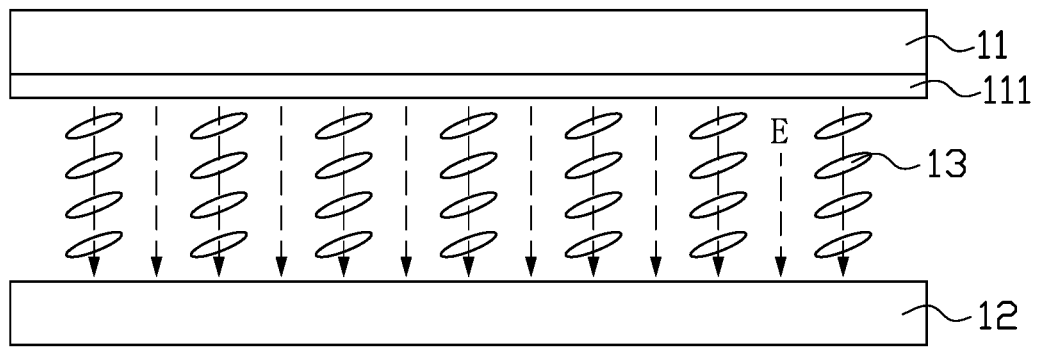
FIG. 2 is a partial cross-sectional view of the liquid crystal display device of FIG. 1 in a narrow viewing angle.
Figure 3:
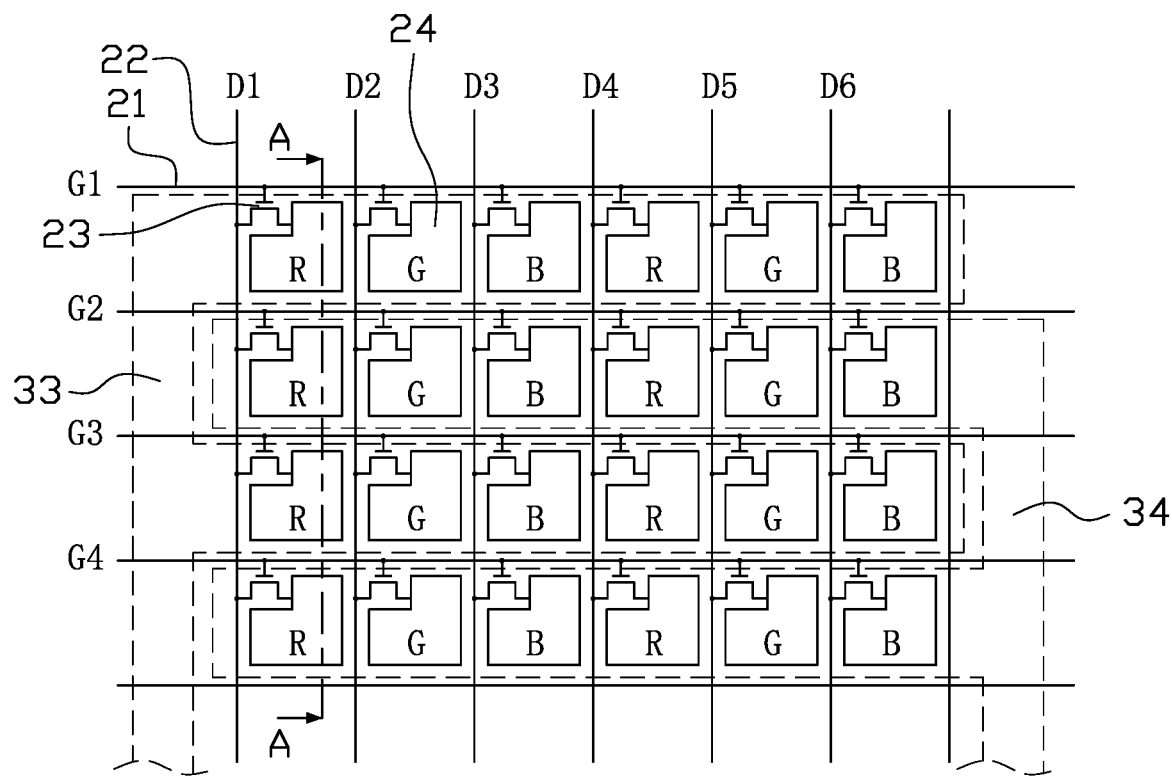
FIG. 3 is a schematic diagram showing the circuit structure of a liquid crystal display device in a first embodiment of the present application.
Figure 4:
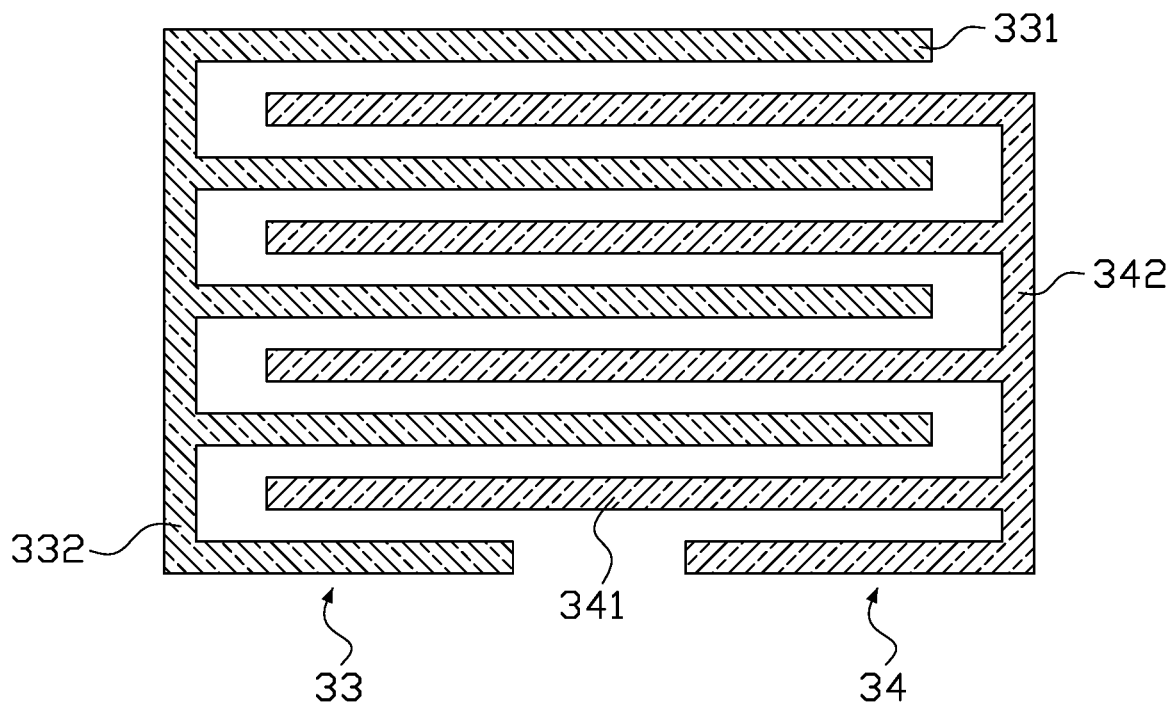
FIG. 4 is a schematic plan view showing the first bias electrode and the second bias electrode of FIG. 3.
Figure 5:
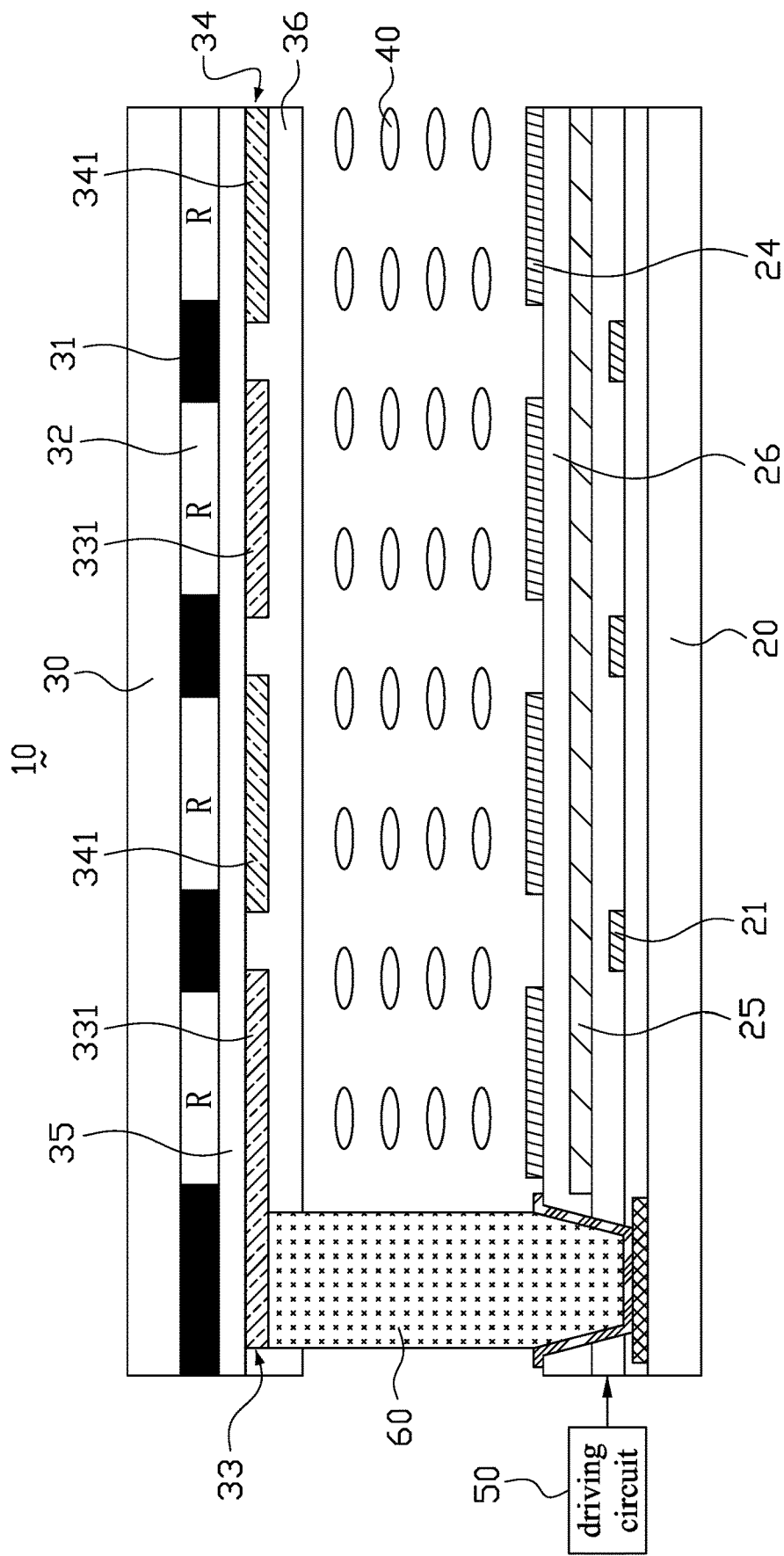
FIG. 5 is a schematic cross-sectional view of the liquid crystal display device of FIG. 3 taken along line A-A.

Referring to FIG. 3 to FIG. 5, the liquid crystal display device switchable between wide and narrow viewing angles provided by the first embodiment of the present application includes a display panel 10. The display panel 10 includes a lower substrate 20, an upper substrate 30 disposed opposite to the lower substrate 20, and a liquid crystal layer 40 located between the lower substrate 20 and the upper substrate 30. The lower substrate 20 may be a thin film transistor array substrate (i.e., an array substrate), and the upper substrate 30 may be a color filter substrate (i.e., a CF substrate).

The lower substrate 20 is provided with scanning lines 21, data lines 22, switching elements 23, pixel electrodes 24 and a common electrode 25 on the side facing the liquid crystal layer 40, but the present application is not limited thereto. The switching element 23 is, for example, a thin film transistor (TFT). On the lower substrate 20, a plurality of scanning lines 21 and a plurality of data lines 22 are insulated from each other to define a plurality of pixel units arranged in an array. A switching element 23 and a pixel electrode 24 are provided in each pixel unit, and the pixel electrode 24 is connected to the scanning line 21 and the data line 22 through the switching element 23. Each switching element 23 includes a gate, an active layer, a source and a drain, wherein the gate is electrically connected to a corresponding scanning line 21, the source is electrically connected to a corresponding data line 22, and the drain is electrically connected to a corresponding pixel electrode 24.

It is to be understood that the lower substrate 20 may also be provided with at least one insulating layer or overcoat layer to insulate adjacent electrodes or trace lines from each other or to flatten the inner side of the lower substrate 20.

In this embodiment, the common electrode 25 is formed on the lower substrate 20, and the common electrode 25 and the pixel electrodes 24 are located in different layers with an insulating layer 26 interposed therebetween, and the pixel electrodes 24 are located above the common electrode 25, that is, the pixel electrodes 24 is closer to the liquid crystal layer 40 compared with the common electrode 25. In this case, the liquid crystal display device is a fringe field switching (FFS) type. When the liquid crystal display device is in normal display, a fringe electric field is generated between the common electrode 25 and the pixel electrodes 24, so that the liquid crystal molecules are rotated in a plane substantially parallel to the substrate to obtain a wider viewing angle.

In other embodiments, on the lower substrate 20, the common electrode 25 and the pixel electrodes 24 may be located in the same layer. The common electrode 25 and the pixel electrodes 24 may be respectively formed into a comb structure and inserted into each other. In this case, the liquid crystal display device is an in-plane switching (IPS) type. When the liquid crystal display device is in normal display, a planar electric field is generated between the common electrode 25 and the pixel electrode 24, so that the liquid crystal molecules are rotated in a plane substantially parallel to the substrate to obtain a wider viewing angle.

The upper substrate 30 is provided with a black matrix (BM) 31, a color resist layer 32, a first bias electrode 33 and a second bias electrode 34 on the side facing the liquid crystal layer 40, but the present application is not limited thereto. The color resist layer 32 is, for example, R, G and B color resist. In this embodiment, the color resist layer 32 and the black matrix 31 are disposed on the inner surface of the upper substrate 30 towards the liquid crystal layer 40, and the other layers are disposed on the color resist layer 32 and the black matrix 31.

The first bias electrode 33 and the second bias electrode 34 are transparent conductive electrodes. The first bias electrode 33 includes a plurality of first electrode strips 331 which are parallel to and spaced apart from each other, and electrically connected together. The second bias electrode 34 includes a plurality of second electrode strips 341 which are parallel to and spaced apart from each other, and electrically connected together. The plurality of first electrode strips 331 and the plurality of second electrode strips 341 are mutually inserted with each other.

In this embodiment, the plurality of first electrode strips 331 and the plurality of second electrode strips 341 both extend in the horizontal direction, that is, both extend along the direction of the scanning lines 21. The plurality of first electrode strips 331 respectively correspond to pixel units located in odd rows (i.e., the first row, the third row, the fifth row, . . . ), and the plurality of second electrode strips 341 respectively correspond to pixel units located in even rows (i.e., the second row, the fourth row, the sixth row, . . . ).

In addition, the first bias electrode 33 further includes a first common conductive strip 332 electrically connected to the plurality of first electrode strips 331, and the second bias electrode 34 further includes a second common conductive strip 342 electrically connected to the plurality of second electrode strips 341. The plurality of first electrode strips 331 and the plurality of second electrode strips 341 are located in the effective display area (not labeled) of the display panel 10, and the first common conductive strip 332 and the second common conductive strip 342 are located in the non-display area (not shown) of the display panel 10.

It can be understood that the upper substrate 30 can also be provided with at least one insulating layer or overcoat layer to insulate adjacent electrodes or trace lines from each other or to flatten the inner side of the upper substrate 30.

In this embodiment, the upper substrate 30 is further provided with a first overcoat layer 35 and a second overcoat layer 36. The first overcoat layer 35 covers the color resist layer 32 and the black matrix 31. The first bias electrode 33 and the second bias electrode 34 are formed on the first overcoat layer 35. The first bias electrode 33 and the second bias electrode 34 can be formed by etching and patterning the same transparent conductive layer. The second overcoat layer 36 covers the first bias electrode 33 and the second bias electrode 34.

The first bias electrode 33, the second bias electrode 34, the common electrode 25 and the pixel electrodes 24 may be made of a transparent conductive material such as indium tin oxide (ITO) or indium zinc oxide (IZO). The first bias electrode 33 and the second bias electrode 34 are used for being applied with voltage signals to achieve switching between wide and narrow viewing angles of the liquid crystal display device. The common electrode 25 is used for being applied with a common voltage (Vcom) for image display. The pixel electrodes 24 are respectively used for receiving driving voltages (Vdata) through the data lines 22 to achieve image display of different gray scales.

In this embodiment, the liquid crystal molecules in the liquid crystal layer 40 are positive liquid crystal molecules, and the positive liquid crystal molecules have the advantage of fast response. As shown in FIG. 5, in the initial state, the positive liquid crystal molecules in the liquid crystal layer 40 are in a lying posture substantially parallel to the substrates 20, 30. That is, the direction of long axis of the positive liquid crystal molecules is substantially parallel to the surfaces of the substrates 20, 30. However, in practical applications, the positive liquid crystal molecules in the liquid crystal layer 40 may have a small initial pretilt angle relative to the substrates 20, 30, and the initial pretilt angle may be less than or equal to 10 degrees, that is, $0°≤θ≤10°$.

The first bias electrode 33 and the second bias electrode 34 of the upper substrate 30 are used to control the liquid crystal display device to realize switching between wide and narrow viewing angles. By applying different voltage signals on the first bias electrode 33 and the second bias electrode 34, different voltage differences (i.e., bias voltages) are generated between the first bias electrode 33 and the pixel electrode 24, the common electrode 25, and between the second bias electrode 34 and the pixel electrode 24, the common electrode 25 to control the liquid crystal display device to switch between a wide viewing angle mode and a narrow viewing angle mode.

Wide viewing angle mode: Referring to FIG. 5, in the wide viewing angle mode, a direct-current common voltage (Vcom) is applied to the common electrode 25, and Vcom may be 0V. The driving voltage (Vdata) is outputted to each pixel electrode 24 of the lower substrate 20 to achieve display of different gray scales through different voltage values (for example, the darkest L0 gray scale corresponds to 0V, the brightest L255 gray scale corresponds to 5V). The first bias electrode 33 and the second bias electrode 34 of the upper substrate 30 are respectively applied with voltage signals such that the voltage differences between the first bias electrode 33 and the common electrode 25 and between the second bias electrode 34 and the common electrode 25 are both less than a preset value (e.g., less than 1 V). At this time, since the voltage differences between the first bias electrode 33 and the common electrode 25 and between the second bias electrode 34 and the common electrode 25 are small, the tilt angle of the liquid crystal molecules in the liquid crystal layer 40 is almost not changed to remain in the nearly lying posture, so that the liquid crystal display device achieves a normal wide viewing angle display.

In the wide viewing angle mode, preferably, a direct-current voltage signal identical to the direct-current common voltage (Vcom) of the common electrode 25 is applied to both the first bias electrode 33 and the second bias electrode 34, such that the voltage differences between the first bias electrode 33 and the common electrode 25, and between the second bias electrode 34 and the common electrode 25 are each zero.

In other embodiments, in the wide viewing angle mode, an alternating-current voltage signal may be applied to both the first bias electrode 33 and the second bias electrode 34 as long as the voltage differences between the first bias electrode 33 and the common electrode 25 and between the second bias electrode 34 and the common electrode 25 are each less than a preset value (e.g., less than 1V).

Figure 6:
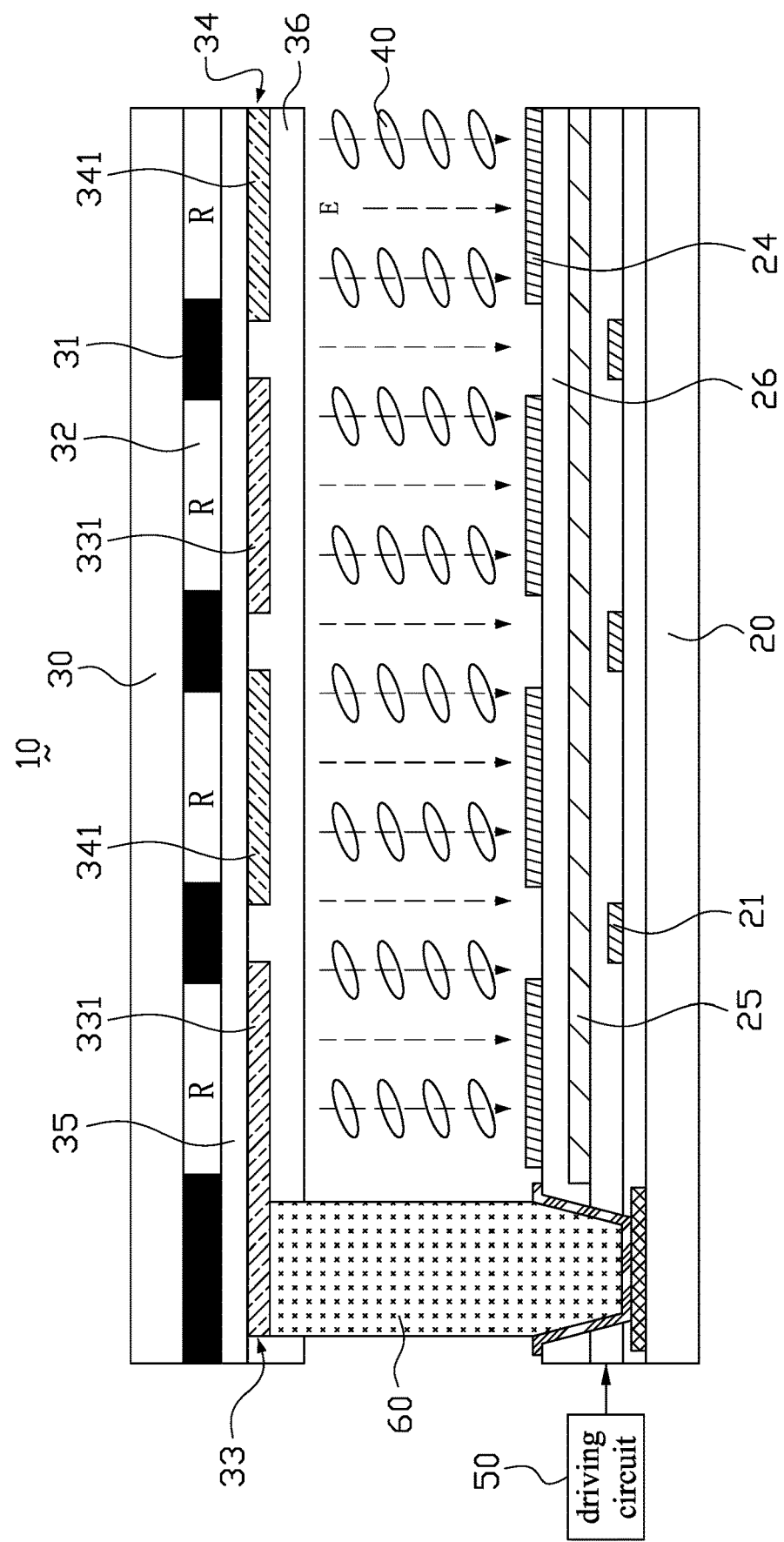
FIG. 6 is a schematic cross-sectional view of the liquid crystal display device of FIG. 3 in the narrow viewing angle.
Figure 7:
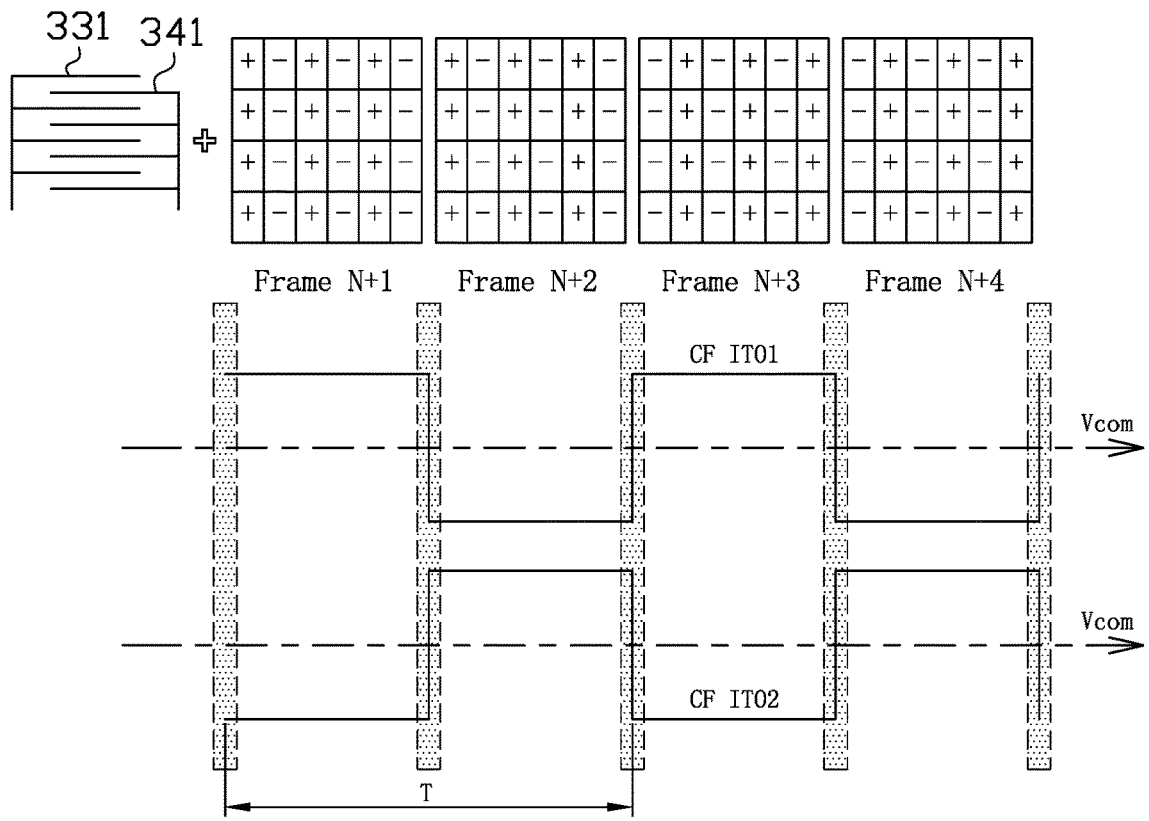
FIG. 7 is a schematic diagram showing the voltage signals applied to the first bias electrode and the second bias electrode and the polarity inversion of the pixel units in different frames when the liquid crystal display device of FIG. 3 is in the narrow viewing angle.

Narrow viewing angle mode: Referring simultaneously to FIG. 6 and FIG. 7, in the narrow viewing angle mode, a direct-current common voltage (Vcom) is applied to the common electrode 25, and Vcom may be 0V. The driving voltage (Vdata) is outputted to each pixel electrode 24 of the lower substrate 20 to achieve display of different gray scales through different voltage values (for example, the darkest L0 gray scale corresponds to 0V, the brightest L255 gray scale corresponds to 5V). A first alternating-current voltage (indicated by CF ITO1 in the figure) is applied to the first bias electrode 33 of the upper substrate 30, and a second alternating-current voltage (indicated by CF ITO2 in the figure) is applied to the second bias electrode 34 of the upper substrate 30, such that the voltage differences between the first bias electrode 33 and the common electrode 25 and between the second bias electrode 34 and the common electrode 25 are both greater than a preset value (e.g., greater than 3V). At this time, since the voltage differences between the first bias electrode 33 and the common electrode 25 and between the second bias electrode 34 and the common electrode 25 are large, a strong vertical electric field E (as indicated by the arrows in FIG. 6) is generated in the liquid crystal cell between the lower substrate 20 and the upper substrate 30. Since the positive liquid crystal molecules will rotate in a direction parallel to the electric field lines under the electric field, the positive liquid crystal molecules will tilt under the action of the vertical electric field E to cause the tilt angle between the liquid crystal molecules and the substrates 20, 30 to increase, and the liquid crystal molecules change from the lying posture to an tilted posture, so that the liquid crystal display device generates light leakage from large observation angle, the contrast is lowered and the viewing angle is reduced in the squint direction, and the liquid crystal display device finally achieves a narrow viewing angle display.

Preferably, in the narrow viewing angle mode, the first alternating-current voltage applied to the first bias electrode 33 and the second alternating-current voltage applied to the second bias electrode 34 have a potential symmetry center that is the same as the direct-current common voltage (Vcom) of the common electrode 25, that is, both the first alternating-current voltage and the second alternating-current voltage fluctuate around Vcom, and the potential differences with respect to the common electrode 25 are uniform.

In the narrow viewing angle mode, the pixel units covered by each first electrode strip 331 of the first bias electrode 33 have alternating positive and negative polarities, and the pixel units covered by each second electrode strip 341 of the second bias electrode 34 also have alternating positive and negative polarities. In the narrow viewing angle mode, the polarity of the driving voltages outputted to the pixel units adopts column inversion, that is, the polarity of the pixel units of (K+1)th column of the lower substrate 20 and the polarity of the pixel units of adjacent Kth column and (K+2)th column are opposite (K≥1), and the pixel units in each row have alternating positive and negative polarities. In this embodiment, each first electrode strip 331 and each second electrode strip 341 extend in a horizontal direction and cover a row of pixel units. Thus, the pixel units in one row covered by each first electrode strip 331 have alternating positive and negative polarities, and the pixel units in one row covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device. That is, within one period T of the first alternating-current voltage and the second alternating-current voltage, the display panel 10 refreshes two frames, and the polarity of the driving voltage outputted to each pixel unit is inverted once every two frames. That is, the polarities of the (N+1)th frame and the (N+2)th frame are the same, the polarity is reversed in the (N+3)th frame, and the polarities of the (N+4)th frame and the (N+3)th frame are the same (N≥0).

Further, in the narrow viewing angle mode, the first alternating-current voltage applied to the first bias electrode 33 and the second alternating-current voltage applied to the second bias electrode 34 have opposite polarities relative to the direct-current common voltage (Vcom) of the common electrode 25. In this embodiment, the first alternating-current voltage applied to the first bias electrode 33 and the second alternating-current voltage applied to the second bias electrode 34 are both square waves, and are in a mirrored relationship relative to the direct-current common voltage (Vcom) of the common electrode 25. That is, in the same frame, one of the first alternating-current voltage and the second alternating-current voltage is positive and the other one is negative with respect to Vcom. Moreover, the first alternating-current voltage has opposite polarities in two adjacent frames, and the second alternating-current voltage has opposite polarities in two adjacent frames, that is, the first alternating-current voltage and the second alternating-current voltage change its polarity once between every two adjacent frames. Specifically, a blanking time may be provided between two adjacent frames, and the first alternating-current voltage and the second alternating-current voltage may change its positive and negative polarities in the blanking time.

Figure 8:
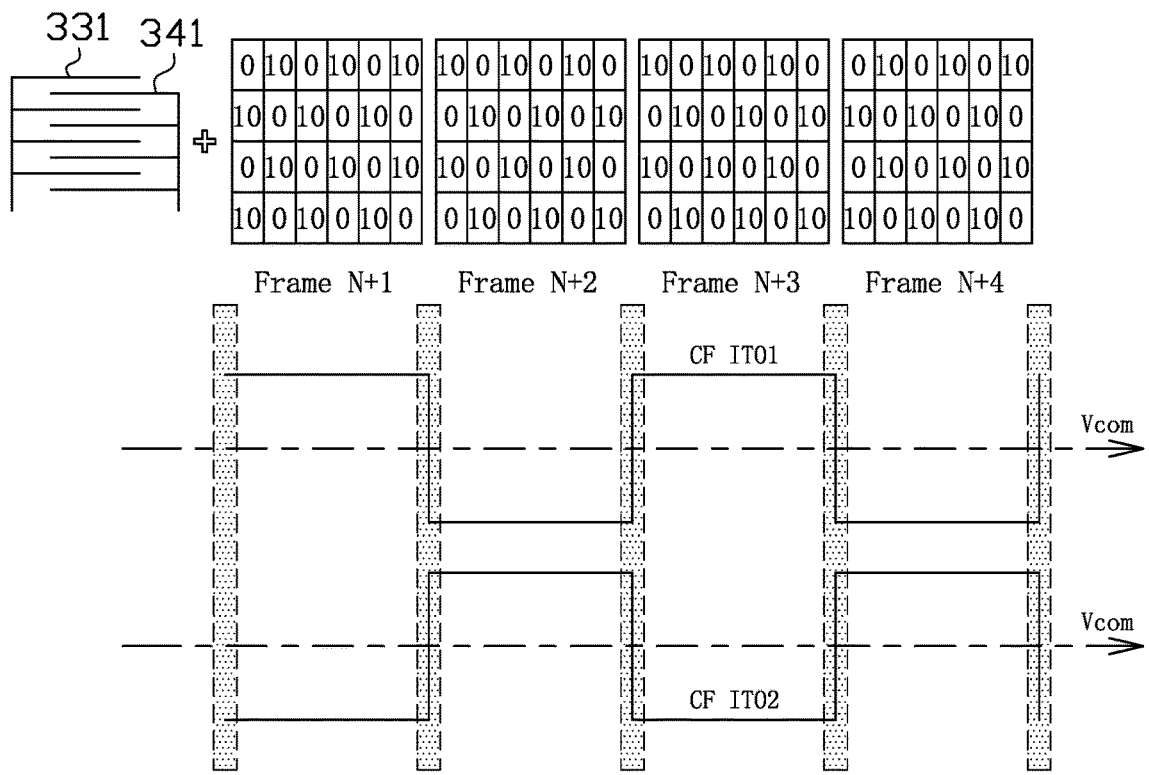
FIG. 8 is similar to FIG. 7, but a numerical value is used in each pixel unit to represent a voltage difference between the first bias electrode, the second bias electrode and the pixel electrodes.

Since the pixel units covered by each first electrode strip 331 of the first bias electrode 33 have alternating positive and negative polarities and the pixel units covered by each second electrode strip 341 of the second bias electrode 34 also have alternating positive and negative polarities, the pixel units with positive and negative polarities in the same row have voltage differences with respect to the first bias electrode 33 or the second bias electrode 34, such that the adjacent pixel units have bright or dark display effect. Taking as an example, the first alternating-current voltage and the second alternating-current voltage are alternating-current square waves of 5V, and a maximal voltage of 5V (+5V for the positive polarity and −5V for the negative polarity) is applied to each of the pixel electrodes 24 when the display panel 10 displays a white frame, please refer to FIG. 7 and FIG. 8, the numerical values in the pixel units in FIG. 8 represent the voltage differences between the first bias electrode 33, the second bias electrode 34 and the pixel electrodes 24 in different frames. It can be seen from the figure, the voltage differences between each first electrode strip 331 and the corresponding pixel electrodes 24 covered by it alternate between 0V and 10y, and likewise, the voltage differences between each second electrode strip 341 and the corresponding pixel electrodes 24 covered by it alternate also between 0V and 10y, and also, the high and low voltage differences in two adjacent rows are staggered.

For the pixel units in the same column, although the pixel units in this column are all positive or negative, they are simultaneously covered by the first bias electrode 33 and the second bias electrode 34, the pixel units in this column will have the display effect that the adjacent pixel units are bright or dark, so that the pixel units in the same column are arranged bright and dark alternately, not in the prior art that the entire column of pixel units is bright or the entire column of pixel units is dark. For two adjacent columns of pixel units, the pixel unit performance in the two adjacent columns of pixel units also appears as a difference in bright and dark. For all pixel units in the entire picture, other pixel units adjacent to the brighter pixel units are relatively darker pixel units, and other pixel units adjacent to the darker pixel units are relatively brighter pixel units. Therefore, there is no dark line problem that all pixel units in the same column of the prior art are bright or dark. The dark line problem formed by pixel units in the same column relative to adjacent columns appears as macroscopically abnormal vertical lines along the column direction.

In the narrow viewing angle mode, the waveform of the periodic alternating-current voltage applied to the first bias electrode 33 and the second bias electrode 34 may be a square wave, a sine wave, a triangular wave, a sawtooth wave or the like.

As shown in FIG. 5 and FIG. 6, the liquid crystal display device further includes a driving circuit 50 through which a desired voltage signal is applied to the first bias electrode 33 or the second bias electrode 34. In order to apply a voltage signal to the first bias electrode 33 and the second bias electrode 34 of the upper substrate 30, the lower substrate 20 may be electrically connected to the upper substrate 30 through a conductive paste 60 in the peripheral non-display area of the display panel 10. A voltage signal is supplied from the driving circuit 50 to the lower substrate 20, and the voltage signal is transmitted from the lower substrate 20 through the conductive paste 60 to the first bias electrode 33 or the second bias electrode 34 of the upper substrate 30.

Further, the second overcoat layer 36 may be formed with a through hole (not labeled) in the peripheral non-display area to expose the first bias electrode 33 or the second bias electrode 34, to facilitate the conductive paste 60 to pass through the corresponding through hole to be electrically connected to the first bias electrode 33 or the second bias electrode 34.

The driving method for a liquid crystal display device capable of switching between wide and narrow viewing angles provided by the embodiment can realize the switching between the two modes of wide and narrow viewing angles by the arrangement of the bias electrodes in the upper substrate and by applying voltage signals to the bias electrodes, and further by the inversion driving of the lower substrate, so that the problem of vertical or horizontal dark lines existing in the prior art is solved, and the display quality of the display device is improved.

It should be noted that, in the wide viewing angle mode of the normal display, the polarity inversion manner of the driving voltage outputted to each pixel unit is not limited, which may adopt column inversion, row inversion, or dot inversion. In addition, the polarity of the driving voltage may be reversed once each frame or every two frames.

Second Embodiment

Figure 9:
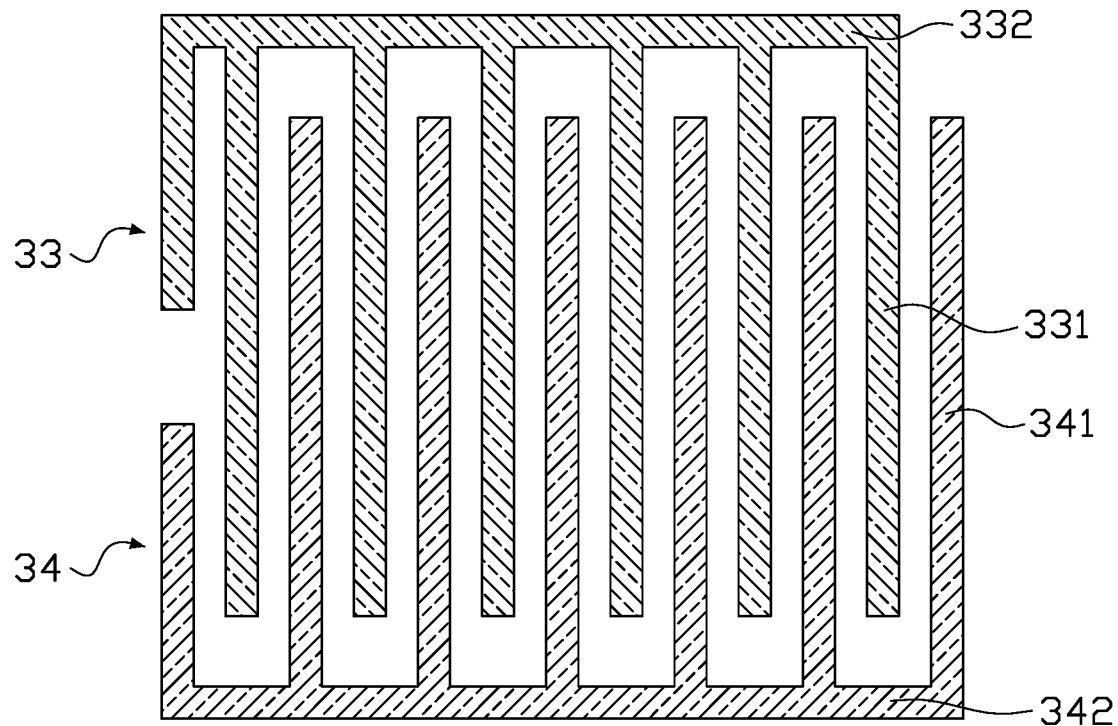
FIG. 9 is a schematic plan view showing the first bias electrode and the second bias electrode of a liquid crystal display device according to a second embodiment of the present application.
Figure 10:
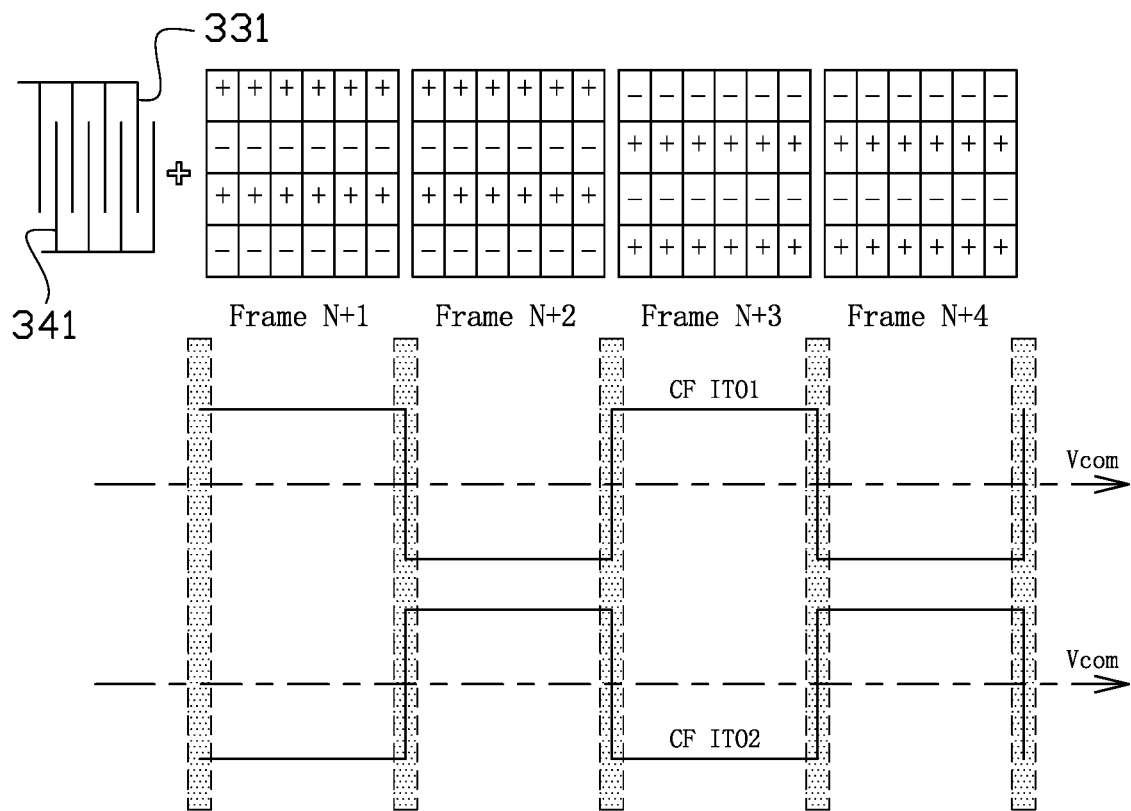
FIG. 10 is a schematic diagram showing the voltage signals applied to the first bias electrode and the second bias electrode and the polarity inversion of the pixel units in different frames when a liquid crystal display device according to a second embodiment of the present application is in the narrow viewing angle.

Referring to FIG. 9 and FIG. 10, the difference between this embodiment and the first embodiment is that, in this embodiment, the plurality of first electrode strips 331 of the first bias electrode 33 and the plurality of second electrode strips 341 of the second bias electrode 34 both extend in the vertical direction, that is, both extend along the direction of the data lines 22. The plurality of first electrode strips 331 respectively correspond to pixel units located in odd columns (i.e., the first column, the third column, the fifth column, . . . ), and the plurality of second electrode strips 341 respectively correspond to pixel units located in even columns (i.e., the second column, the fourth column, the sixth column, . . . ).

As shown in FIG. 10, in the narrow viewing angle mode, the polarity of the driving voltages outputted to the pixel units adopts row inversion, that is, the polarity of the pixel units of (K+1)th row of the lower substrate 20 and the polarity of the pixel units of adjacent Kth row and (K+2)th row are opposite (K≥1), and the pixel units in each column have alternating positive and negative polarities. In this embodiment, each first electrode strip 331 and each second electrode strip 341 extend in a vertical direction and cover a column of pixel units. Thus, the pixel units in one column covered by each first electrode strip 331 have alternating positive and negative polarities, and the pixel units in one column covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device, and the polarity of the driving voltage outputted to each pixel unit is inverted once every two frames.

Since the pixel units covered by each first electrode strip 331 of the first bias electrode 33 have alternating positive and negative polarities and the pixel units covered by each second electrode strip 341 of the second bias electrode 34 also have alternating positive and negative polarities, the pixel units with positive and negative polarities in the same column have voltage differences with respect to the first bias electrode 33 or the second bias electrode 34, such that the adjacent pixel units have bright or dark display effect.

For the pixel units in the same row, although the pixel units in this row are all positive or negative, they are simultaneously covered by the first bias electrode 33 and the second bias electrode 34, the pixel units in this row will have the display effect that the adjacent pixel units are bright or dark, so that the pixel units in the same row are arranged bright and dark alternately, not in the prior art that the entire row of pixel units is bright or the entire row of pixel units is dark. For two adjacent rows of pixel units, the pixel unit performance in the two adjacent rows of pixel units also appears as a difference in bright and dark. For all pixel units in the entire picture, other pixel units adjacent to the brighter pixel units are relatively darker pixel units, and other pixel units adjacent to the darker pixel units are relatively brighter pixel units. Therefore, there is no dark line problem that all pixel units in the same row of the prior art are bright or dark. The dark line problem formed by pixel units in the same row relative to adjacent rows appears as macroscopically abnormal vertical lines along the row direction.

For the rest of the embodiment, reference may be made to the description of the first embodiment, and details are not described herein again.

Third Embodiment

Figure 11:
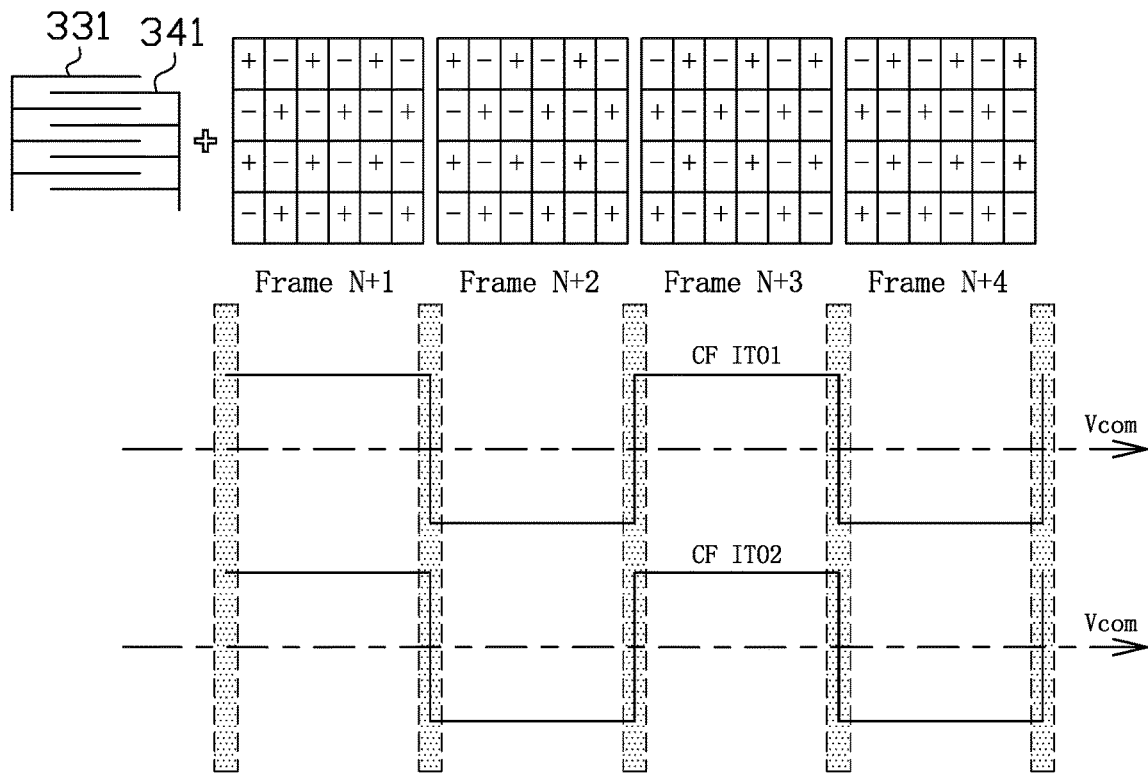
FIG. 11 is a schematic diagram showing the voltage signals applied to the first bias electrode and the second bias electrode and the polarity inversion of the pixel units in different frames when a liquid crystal display device according to a third embodiment of the present application is in the narrow viewing angle.

Referring to FIG. 11, the difference between this embodiment and the first embodiment is that, in the narrow viewing angle mode of this embodiment, the polarity of the driving voltages outputted to the pixel units adopts dot inversion, that is, the polarity of any one of the pixel units is opposite to the polarity of the other adjacent pixel units. Thus, the pixel units in one row covered by each first electrode strip 331 have alternating positive and negative polarities, and the pixel units in one row covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device, and the polarity of the driving voltage outputted to each pixel unit is inverted once every two frames.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. In this embodiment, the first alternating-current voltage applied to the first bias electrode 33 and the second alternating-current voltage applied to the second bias electrode 34 are both square waves and have the same waveform, that is, in the same frame, the first alternating-current voltage and the second alternating-current voltage are both positive or both negative with respect to Vcom.

Since the pixel units covered by each first electrode strip 331 of the first bias electrode 33 have alternating positive and negative polarities and the pixel units covered by each second electrode strip 341 of the second bias electrode 34 also have alternating positive and negative polarities, the pixel units with positive and negative polarities in the same row have voltage differences with respect to the first bias electrode 33 or the second bias electrode 34, such that the adjacent pixel units have bright or dark display effect. For all pixel units in the entire picture, other pixel units adjacent to the brighter pixel units are relatively darker pixel units, and other pixel units adjacent to the darker pixel units are relatively brighter pixel units. Therefore, there is no dark line problem that all pixel units in the same column of the prior art are bright or dark. The dark line problem formed by pixel units in the same column relative to adjacent columns appears as macroscopically abnormal vertical lines along the column direction.

For the rest of the embodiment, reference may be made to the description of the first embodiment, and details are not described herein again.

Fourth Embodiment

Figure 12:
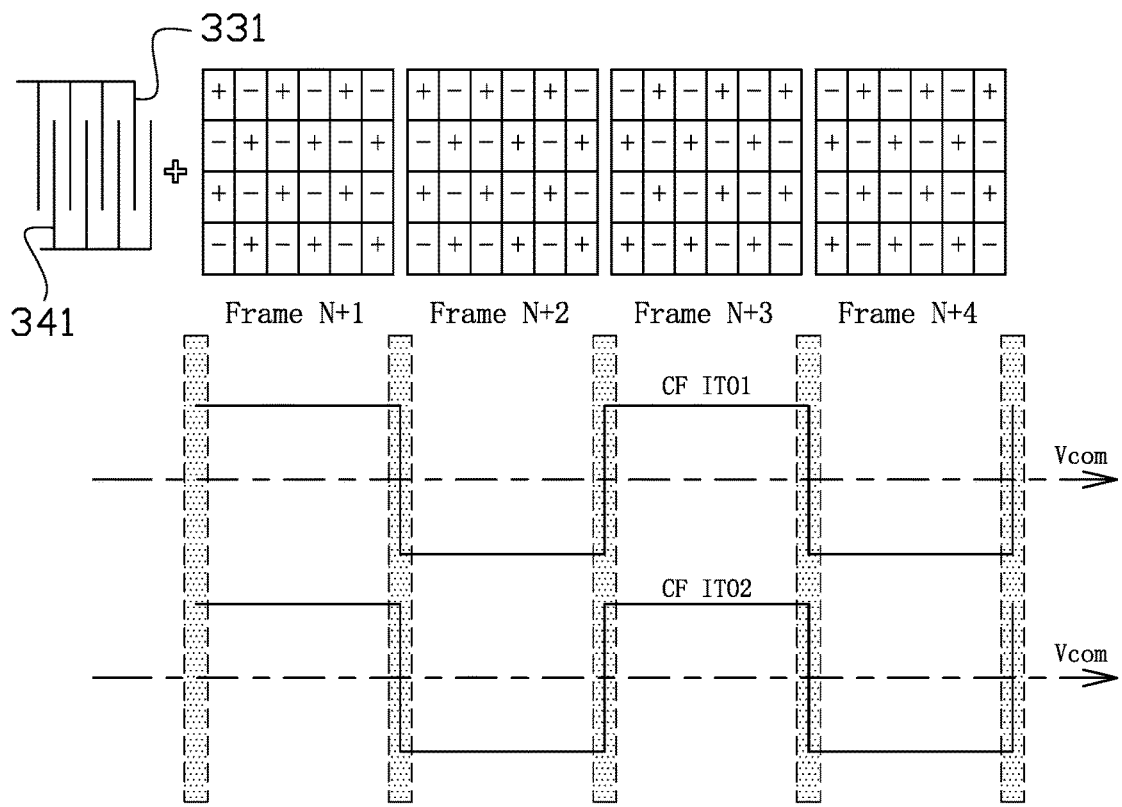
FIG. 12 is a schematic diagram showing the voltage signals applied to the first bias electrode and the second bias electrode and the polarity inversion of the pixel units in different frames when a liquid crystal display device according to a fourth embodiment of the present application is in the narrow viewing angle.

Referring to FIG. 12, the difference between this embodiment and the first embodiment is that, in the embodiment, the plurality of first electrode strips 331 of the first bias electrode 33 and the plurality of second electrode strips 341 of the second bias electrode 34 both extend in the vertical direction, that is, both extend along the direction of the data lines 22. The plurality of first electrode strips 331 respectively correspond to pixel units located in odd columns (i.e., the first column, the third column, the fifth column, . . . ), and the plurality of second electrode strips 341 respectively correspond to pixel units located in even columns (i.e., the second column, the fourth column, the sixth column, . . . ).

In the narrow viewing angle mode, the polarity of the driving voltages outputted to the pixel units adopts dot inversion, that is, the polarity of any one of the pixel units is opposite to the polarity of the other adjacent pixel units.

Thus, the pixel units in one column covered by each first electrode strip 331 have alternating positive and negative polarities, and the pixel units in one column covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device, and the polarity of the driving voltage outputted to each pixel unit is inverted once every two frames.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. In this embodiment, the first alternating-current voltage applied to the first bias electrode 33 and the second alternating-current voltage applied to the second bias electrode 34 are both square waves and have the same waveform, that is, in the same frame, the first alternating-current voltage and the second alternating-current voltage are both positive or both negative with respect to Vcom.

Since the pixel units covered by each first electrode strip 331 of the first bias electrode 33 have alternating positive and negative polarities and the pixel units covered by each second electrode strip 341 of the second bias electrode 34 also have alternating positive and negative polarities, the pixel units with positive and negative polarities in the same column have voltage differences with respect to the first bias electrode 33 or the second bias electrode 34, such that the adjacent pixel units have bright or dark display effect. For all pixel units in the entire picture, other pixel units adjacent to the brighter pixel units are relatively darker pixel units, and other pixel units adjacent to the darker pixel units are relatively brighter pixel units. Therefore, there is no dark line problem that all pixel units in the same row of the prior art are bright or dark. The dark line problem formed by pixel units in the same row relative to adjacent rows appears as macroscopically abnormal vertical lines along the row direction.

For the rest of the embodiment, reference may be made to the description of the first embodiment, and details are not described herein again.

Fifth Embodiment

Figure 13:
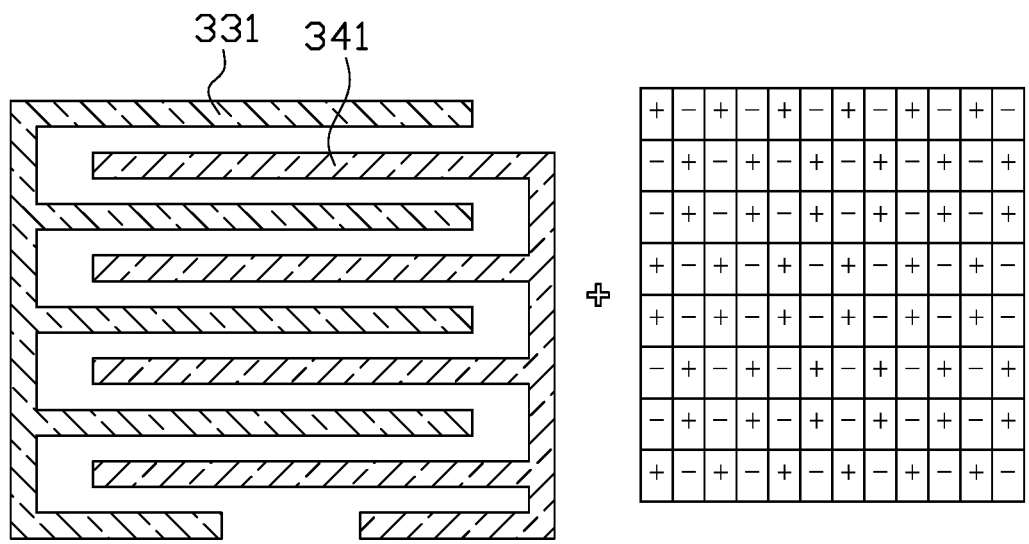
FIG. 13 is a schematic diagram showing the first bias electrode and the second bias electrode and the polarity inversion of the pixel units of a liquid crystal display device according to a fifth embodiment of the present application.

Referring to FIG. 13, the difference between this embodiment and the first embodiment is that, in the narrow viewing angle mode, the polarity of the driving voltages outputted to the pixel units adopts dot inversion in the form of two adjacent dots as a group (i.e., 2DOT inversion), that is, the polarity of two of the pixel units are the same and are opposite to the polarity of the other adjacent pixel units. Thus, the pixel units in one row covered by each first electrode strip 331 have alternating positive and negative polarities, and the pixel units in one row covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device, and the polarity of the driving voltage outputted to each pixel unit is inverted once every two frames.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25.

For the rest of the content and the principle of the embodiment, reference may be made to the descriptions of the first embodiment and the third embodiment, and details are not described herein again.

Sixth Embodiment

Figure 14:
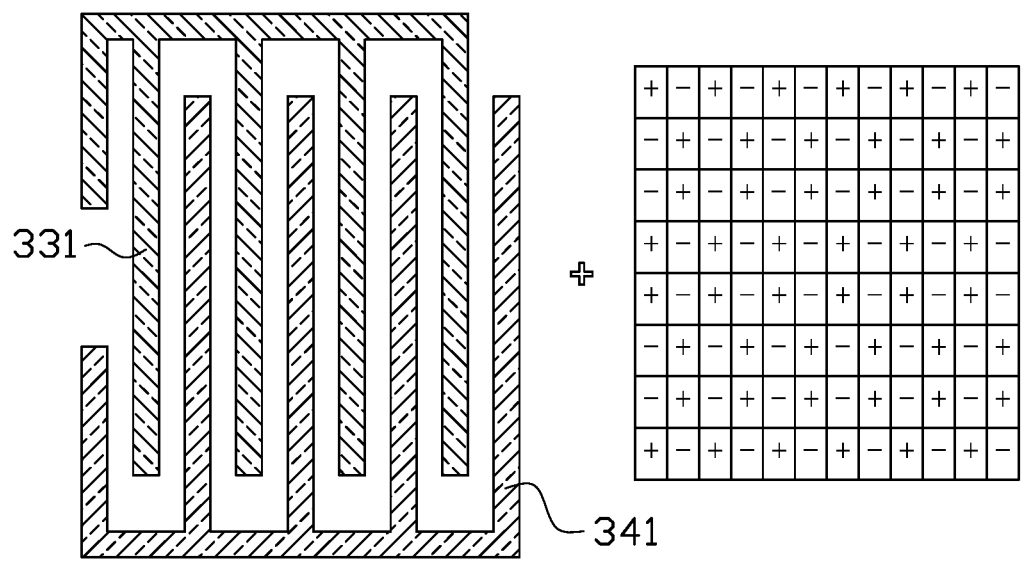
FIG. 14 is a schematic diagram showing the first bias electrode and the second bias electrode and the polarity inversion of the pixel units of a liquid crystal display device according to a sixth embodiment of the present application.

Referring to FIG. 14, the difference between this embodiment and the first embodiment is that, in the embodiment, the plurality of first electrode strips 331 of the first bias electrode 33 and the plurality of second electrode strips 341 of the second bias electrode 34 both extend in the vertical direction, that is, both extend along the direction of the data lines 22. The plurality of first electrode strips 331 respectively correspond to pixel units located in odd columns (i.e., the first column, the third column, the fifth column, ... ), and the plurality of second electrode strips 341 respectively correspond to pixel units located in even columns (i.e., the second column, the fourth column, the sixth column, ... ).

In the narrow viewing angle mode, the polarity of the driving voltages outputted to the pixel units adopts dot inversion in the form of two adjacent dots as a group (i.e., 2DOT inversion), that is, the polarity of two of the pixel units are the same and are opposite to the polarity of the other adjacent pixel units. Thus, the pixel units in one column covered by each first electrode strip 331 have alternating positive and negative polarities, and the pixel units in one column covered by each second electrode strip 341 also have alternating positive and negative polarities.

In the narrow viewing angle mode, the frequency of the first alternating-current voltage applied to the first bias electrode 33 and the frequency of the second alternating-current voltage applied to the second bias electrode 34 are both ½ of the frame rate of the liquid crystal display device, and the polarity of the driving voltage outputted to each pixel unit is inverted once every two frames.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25.

For the rest of the content and the principle of the embodiment, reference may be made to the description of the first embodiment and the fourth embodiment, and details are not described herein again.

Seventh Embodiment

Figure 15:
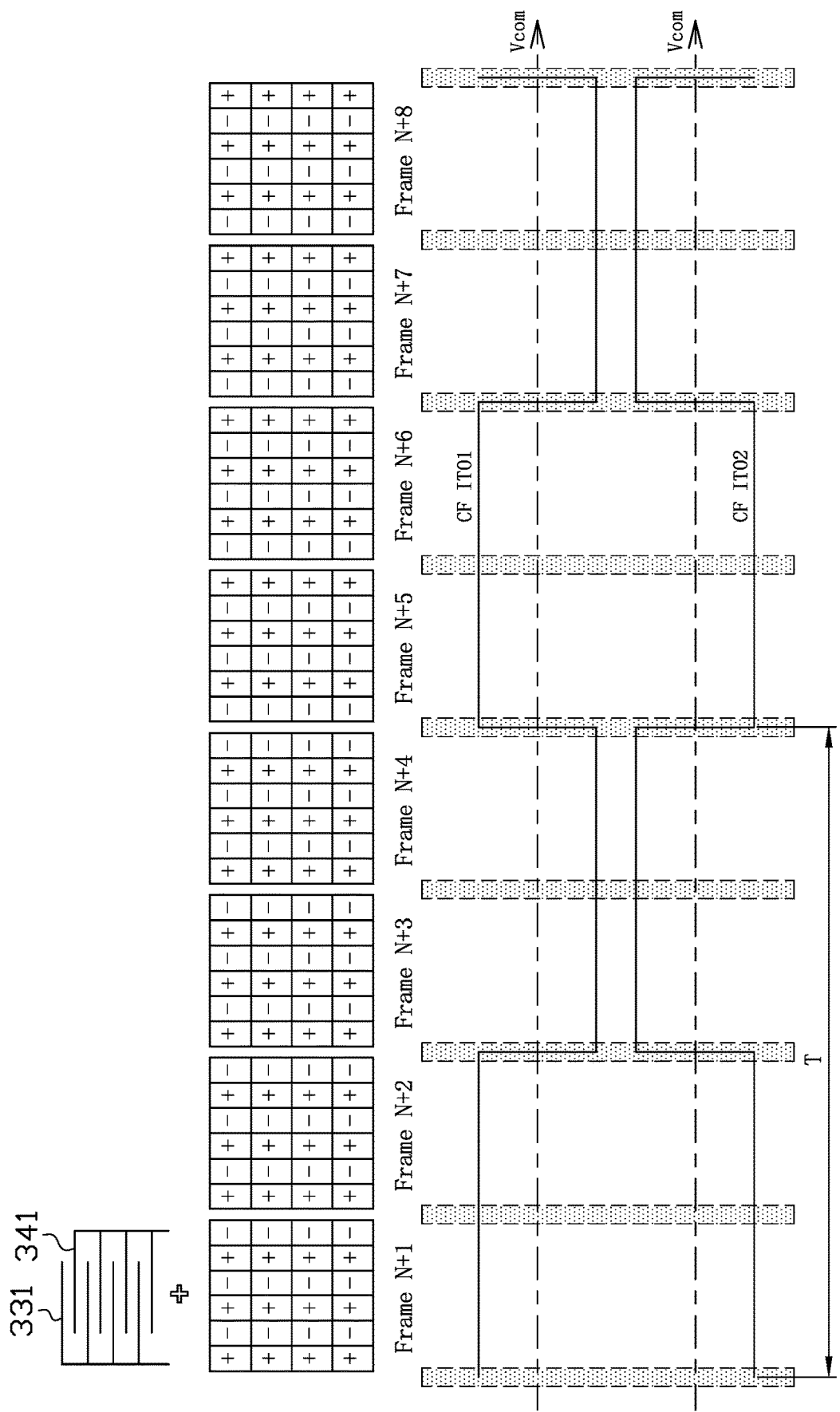
FIG. 15 is a schematic diagram showing the voltage signals applied to the first bias electrode and the second bias electrode and the polarity inversion of the pixel units in different frames when a liquid crystal display device according to a seventh embodiment of the present application is in the narrow viewing angle.

Referring to FIG. 15, the driving manner of this embodiment is different from the first embodiment (refer to FIG. 7) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every four frames. That is, the polarities of the (N+1)th frame, the (N+2)th frame, the (N+3)th frame and the (N+4)th frame are the same, the polarity is reversed in the (N+5)th frame, and the polarities of the (N+8)th frame, the (N+7)th frame, the (N+6)th frame and the (N+5)th frame are the same (N≥0).

In the narrow viewing angle mode, the first alternating-current voltage applied to the first bias electrode 33 and the second alternating-current voltage applied to the second bias electrode 34 have opposite polarities relative to the direct-current common voltage (Vcom) of the common electrode 25. Specifically, the first alternating-current voltage applied to the first bias electrode 33 and the second alternating-current voltage applied to the second bias electrode 34 are both square waves, and are in a mirrored relationship relative to the direct-current common voltage (Vcom) of the common electrode 25.

In the narrow viewing angle mode, the polarity of the driving voltages outputted to the pixel units adopts column inversion, to prevent the dark line problem that the pixel units in the same column of the prior art are bright or dark. The dark line problem formed by pixel units in the same column relative to adjacent columns appears as macroscopically abnormal vertical lines along the column direction.

Eighth Embodiment

Figure 16:
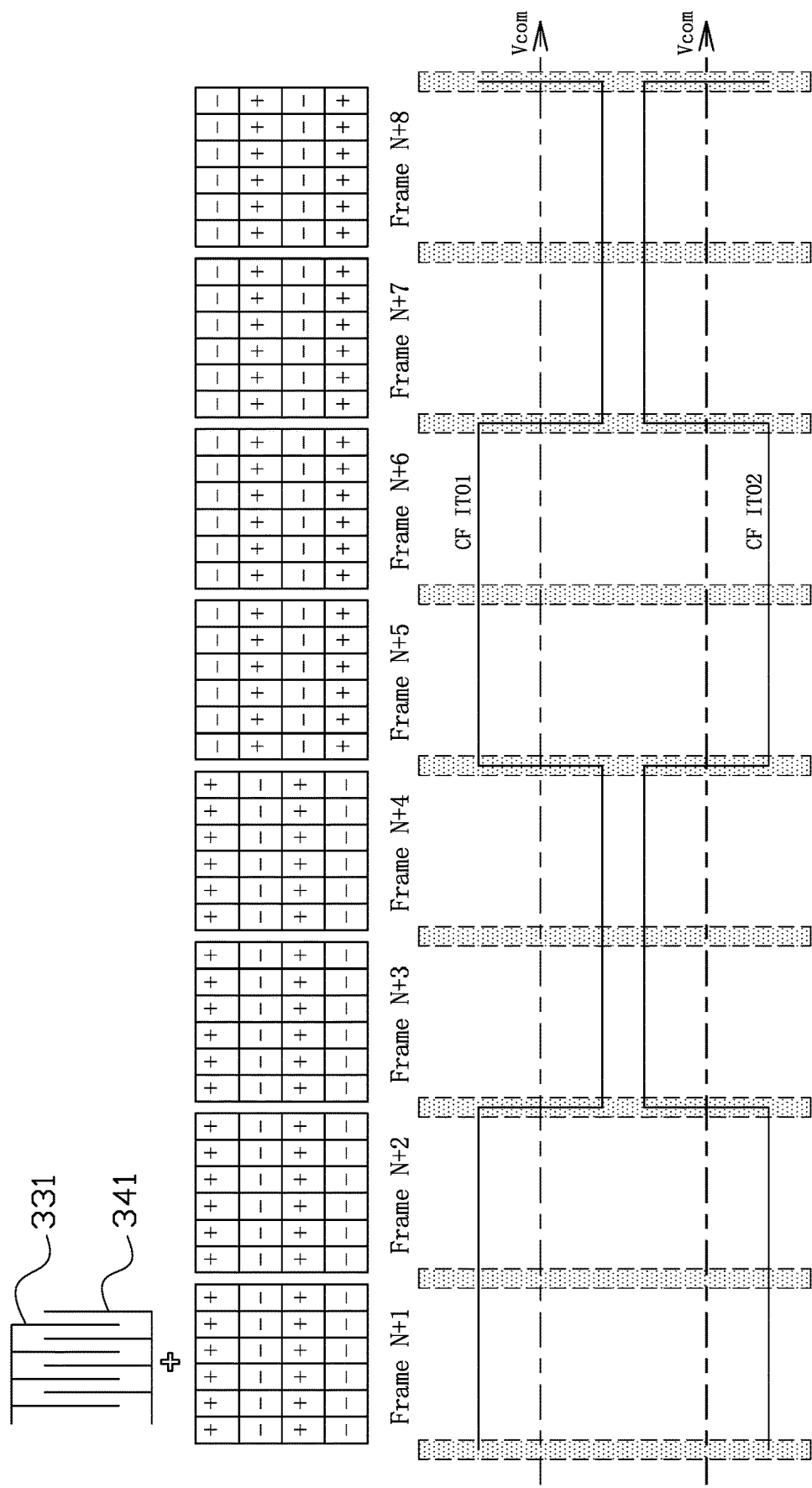
FIG. 16 is a schematic diagram showing the voltage signals applied to the first bias electrode and the second bias electrode and the polarity inversion of the pixel units in different frames when a liquid crystal display device according to an eighth embodiment of the present application is in the narrow viewing angle.

Referring to FIG. 16, the driving manner of this embodiment is different from the second embodiment (refer to FIG. 10) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every four frames. That is, the polarities of the (N+1)th frame, the (N+2)th frame, the (N+3)th frame and the (N+4)th frame are the same, the polarity is reversed in the (N+5)th frame, and the polarities of the (N+8)th frame, the (N+7)th frame, the (N+6)th frame and the (N+5)th frame are the same (N≥0).

In the narrow viewing angle mode, the first alternating-current voltage applied to the first bias electrode 33 and the second alternating-current voltage applied to the second bias electrode 34 have opposite polarities relative to the direct-current common voltage (Vcom) of the common electrode 25. Specifically, the first alternating-current voltage applied to the first bias electrode 33 and the second alternating-current voltage applied to the second bias electrode 34 are both square waves, and are in a mirrored relationship relative to the direct-current common voltage (Vcom) of the common electrode 25.

In the narrow viewing angle mode, the polarity of the driving voltages outputted to the pixel units adopts row inversion, to prevent the dark line problem that the pixel units in the same row of the prior art are bright or dark. The dark line problem formed by pixel units in the same row relative to adjacent rows appears as macroscopically abnormal vertical lines along the row direction.

Ninth Embodiment

Figure 17:
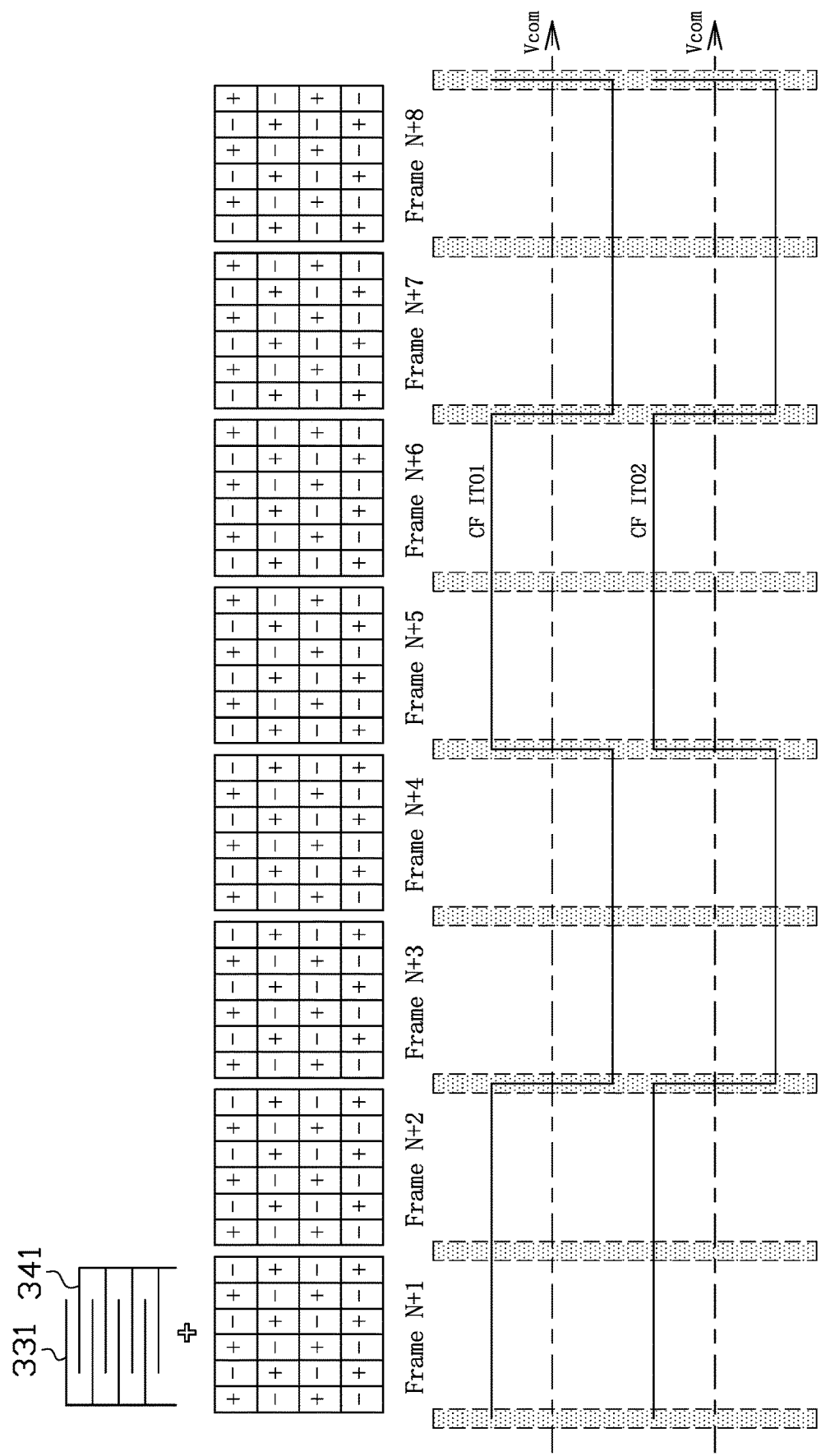
FIG. 17 is a schematic diagram showing the voltage signals applied to the first bias electrode and the second bias electrode and the polarity inversion of the pixel units in different frames when a liquid crystal display device according to a ninth embodiment of the present application is in the narrow viewing angle.

Referring to FIG. 17, the driving manner of this embodiment is different from the third embodiment (refer to FIG. 11) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every four frames. That is, the polarities of the (N+1)th frame, the (N+2)th frame, the (N+3)th frame and the (N+4)th frame are the same, the polarity is reversed in the (N+5)th frame, and the polarities of the (N+8)th frame, the (N+7)th frame, the (N+6)th frame and the (N+5)th frame are the same (N≥0).

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. Specifically, the first alternating-current voltage applied to the first bias electrode 33 and the second alternating-current voltage applied to the second bias electrode 34 are both square waves and have the same waveform.

In the narrow viewing angle mode, the polarity of the driving voltages outputted to the pixel units adopts dot inversion, to prevent the dark line problem that the pixel units in the same column of the prior art are bright or dark. The dark line problem formed by pixel units in the same column relative to adjacent columns appears as macroscopically abnormal vertical lines along the column direction.

Tenth Embodiment

Figure 18:
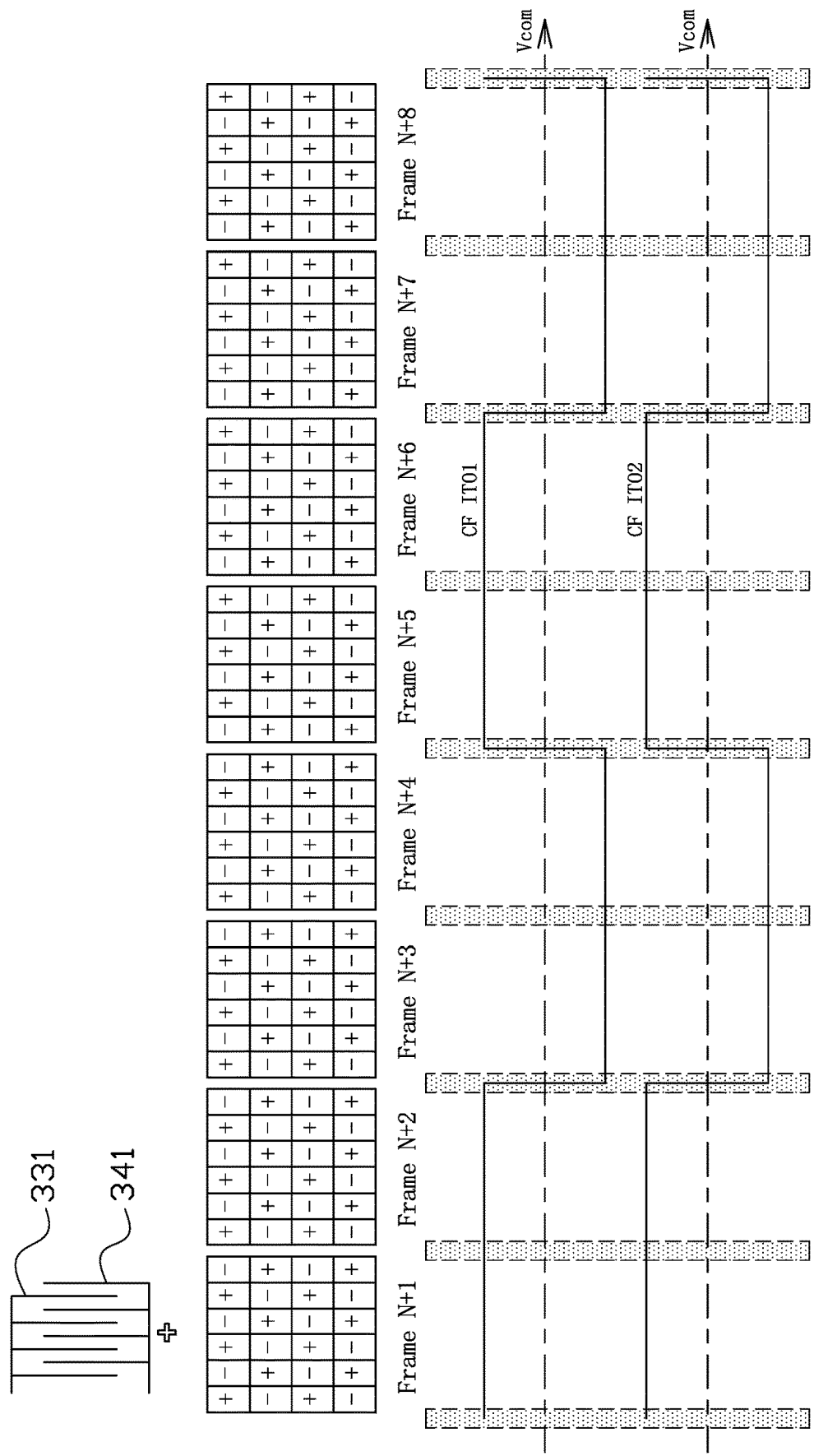
FIG. 18 is a schematic diagram showing the voltage signals applied to the first bias electrode and the second bias electrode and the polarity inversion of the pixel units in different frames when a liquid crystal display device according to a tenth embodiment of the present application is in the narrow viewing angle.

Referring to FIG. 18, the driving manner of this embodiment is different from the fourth embodiment (refer to FIG. 12) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every four frames. That is, the polarities of the (N+1)th frame, the (N+2)th frame, the (N+3)th frame and the (N+4)th frame are the same, the polarity is reversed in the (N+5)th frame, and the polarities of the (N+8)th frame, the (N+7)th frame, the (N+6)th frame and the (N+5)th frame are the same (N≥0).

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. Specifically, the first alternating-current voltage applied to the first bias electrode 33 and the second alternating-current voltage applied to the second bias electrode 34 are both square waves and have the same waveform.

In the narrow viewing angle mode, the polarity of the driving voltages outputted to the pixel units adopts dot inversion, to prevent the dark line problem that the pixel units in the same row of the prior art are bright or dark. The dark line problem formed by pixel units in the same row relative to adjacent rows appears as macroscopically abnormal vertical lines along the row direction.

Eleventh Embodiment

Figure 19:
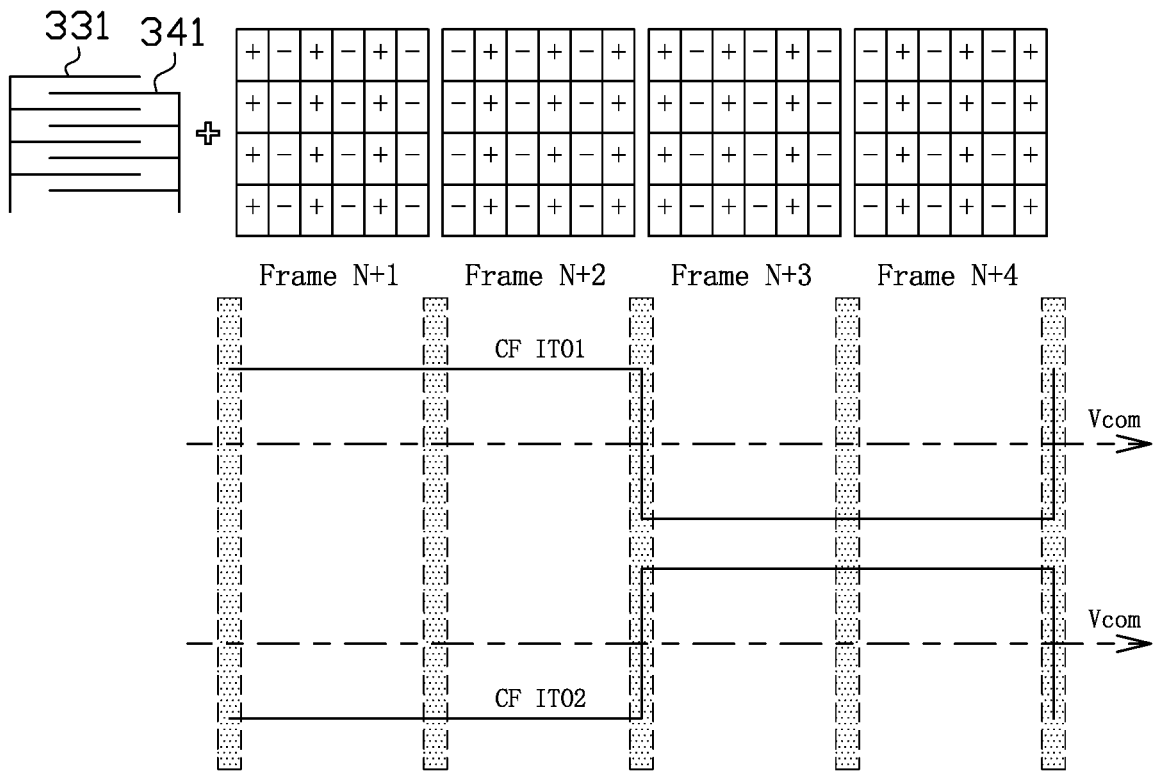
FIG. 19 is a schematic diagram showing the voltage signals applied to the first bias electrode and the second bias electrode and the polarity inversion of the pixel units in different frames when a liquid crystal display device according to an eleventh embodiment of the present application is in the narrow viewing angle.

Referring to FIG. 19, the driving manner of this embodiment is different from the first embodiment (refer to FIG. 7) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every frame, that is, the polarity of each pixel unit in two adjacent frames is different.

In the narrow viewing angle mode, the first alternating-current voltage applied to the first bias electrode 33 and the second alternating-current voltage applied to the second bias electrode 34 have opposite polarities relative to the direct-current common voltage (Vcom) of the common electrode 25. Specifically, the first alternating-current voltage applied to the first bias electrode 33 and the second alternating-current voltage applied to the second bias electrode 34 are both square waves, and are in a mirrored relationship relative to the direct-current common voltage (Vcom) of the common electrode 25.

In the narrow viewing angle mode, the polarity of the driving voltages outputted to the pixel units adopts column inversion, to prevent the dark line problem that the pixel units in the same column of the prior art are bright or dark. The dark line problem formed by pixel units in the same column relative to adjacent columns appears as macroscopically abnormal vertical lines along the column direction.

Twelfth Embodiment

Figure 20:
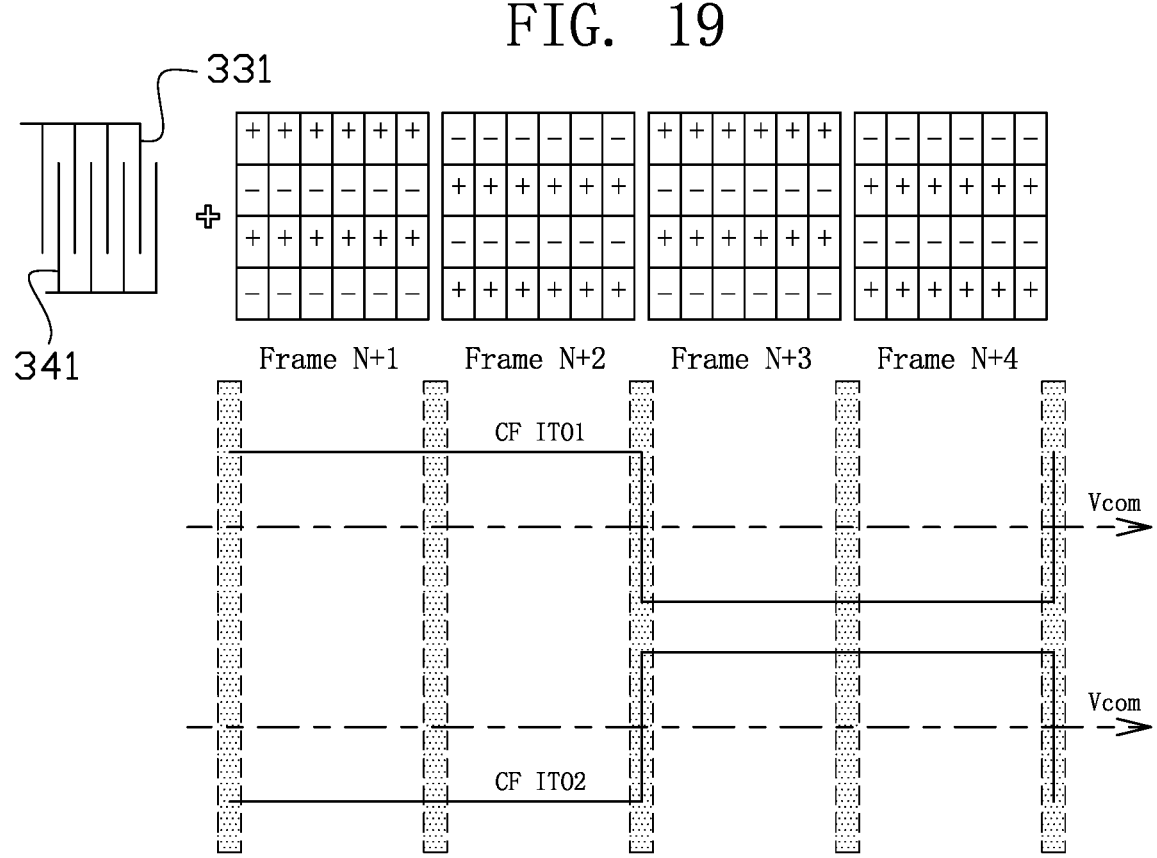
FIG. 20 is a schematic diagram showing the voltage signals applied to the first bias electrode and the second bias electrode and the polarity inversion of the pixel units in different frames when a liquid crystal display device according to a twelfth embodiment of the present application is in the narrow viewing angle.

Referring to FIG. 20, the driving manner of this embodiment is different from the second embodiment (refer to FIG. 10) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every frame, that is, the polarity of each pixel unit in two adjacent frames is different.

In the narrow viewing angle mode, the first alternating-current voltage applied to the first bias electrode 33 and the second alternating-current voltage applied to the second bias electrode 34 have opposite polarities relative to the direct-current common voltage (Vcom) of the common electrode 25. Specifically, the first alternating-current voltage applied to the first bias electrode 33 and the second alternating-current voltage applied to the second bias electrode 34 are both square waves, and are in a mirrored relationship relative to the direct-current common voltage (Vcom) of the common electrode 25.

In the narrow viewing angle mode, the polarity of the driving voltages outputted to the pixel units adopts row inversion, to prevent the dark line problem that the pixel units in the same row of the prior art are bright or dark. The dark line problem formed by pixel units in the same row relative to adjacent rows appears as macroscopically abnormal vertical lines along the row direction.

Thirteenth Embodiment

Figure 21:
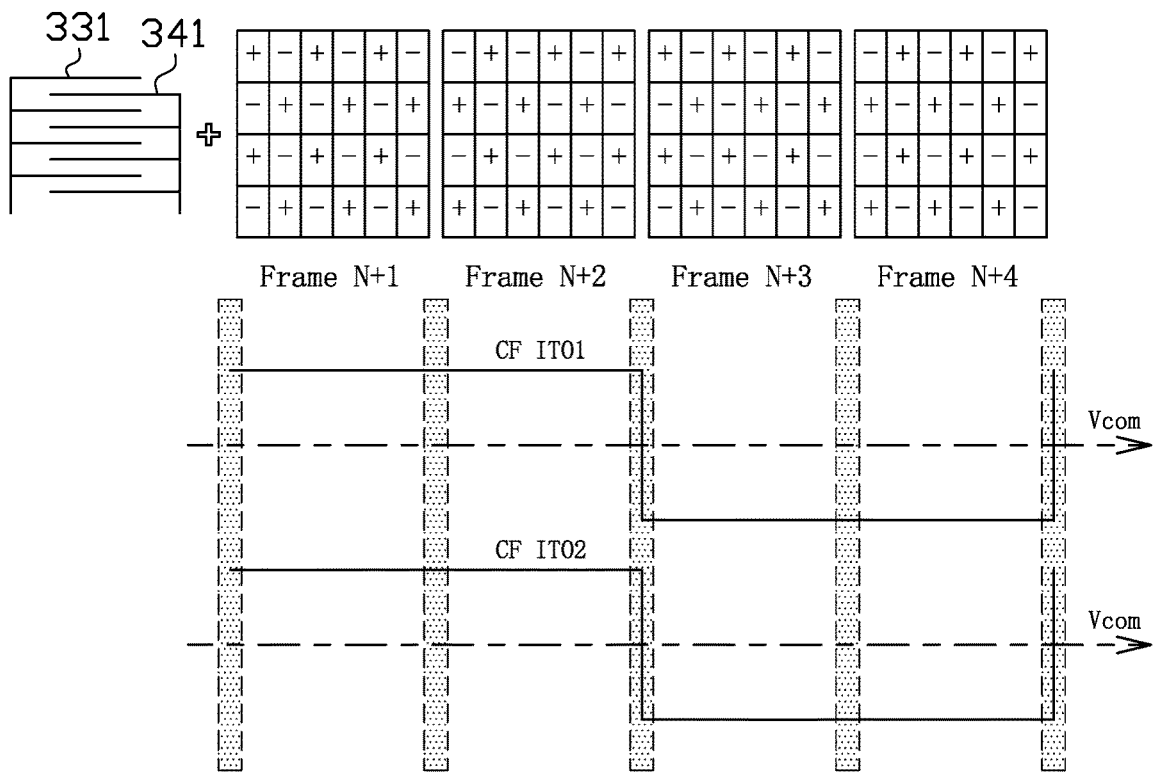
FIG. 21 is a schematic diagram showing the voltage signals applied to the first bias electrode and the second bias electrode and the polarity inversion of the pixel units in different frames when a liquid crystal display device according to a thirteenth embodiment of the present application is in the narrow viewing angle.

Referring to FIG. 21, the driving manner of this embodiment is different from the third embodiment (refer to FIG. 11) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every frame, that is, the polarity of each pixel unit in two adjacent frames is different.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. Specifically, the first alternating-current voltage applied to the first bias electrode 33 and the second alternating-current voltage applied to the second bias electrode 34 are both square waves and have the same waveform.

In the narrow viewing angle mode, the polarity of the driving voltages outputted to the pixel units adopts dot inversion, to prevent the dark line problem that the pixel units in the same column of the prior art are bright or dark. The dark line problem formed by pixel units in the same column relative to adjacent columns appears as macroscopically abnormal vertical lines along the column direction.

Fourteenth Embodiment

Figure 22:
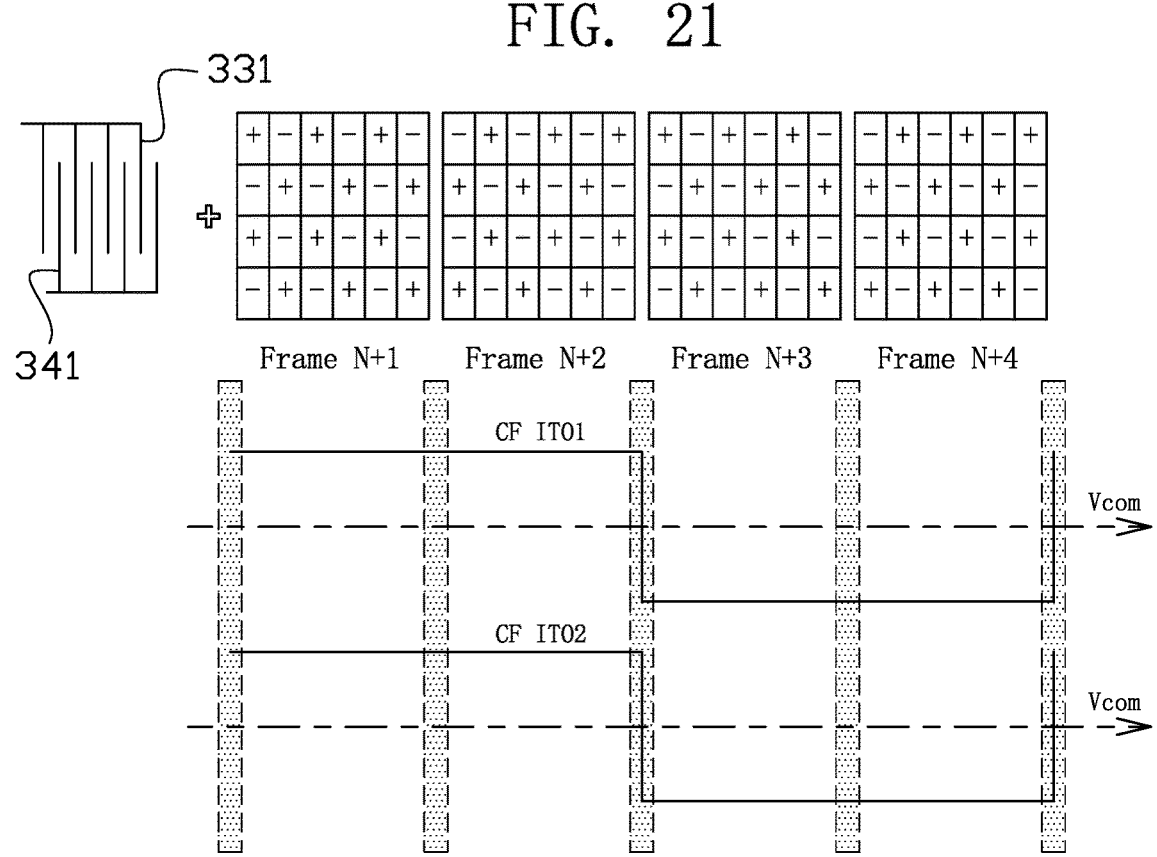
FIG. 22 is a schematic diagram showing the voltage signals applied to the first bias electrode and the second bias electrode and the polarity inversion of the pixel units in different frames when a liquid crystal display device according to a fourteenth embodiment of the present application is in the narrow viewing angle.

Referring to FIG. 22, the driving manner of this embodiment is different from the fourth embodiment (refer to FIG. 12) in that, in the narrow viewing angle mode, the frequency of the first alternating-current voltage applied to the first bias electrode 33 and the frequency of the second alternating-current voltage applied to the second bias electrode 34 are both ¼ of the frame rate of the liquid crystal display device. That is, within one period T of the first alternating-current voltage and the second alternating-current voltage, the display panel 10 refreshes four frames, and the polarity of the driving voltage outputted to each pixel unit is inverted once every frame, that is, the polarity of each pixel unit in two adjacent frames is different.

In the narrow viewing angle mode, the first alternating-current voltage applied to the first bias electrode 33 and the second alternating-current voltage applied to the second bias electrode 34 have the same polarity relative to the direct-current common voltage (Vcom) of the common electrode 25. Specifically, the first alternating-current voltage applied to the first bias electrode 33 and the second alternating-current voltage applied to the second bias electrode 34 are both square waves and have the same waveform.

In the narrow viewing angle mode, the polarity of the driving voltages outputted to the pixel units adopts dot inversion, to prevent the dark line problem that the pixel units in the same row of the prior art are bright or dark. The dark line problem formed by pixel units in the same row relative to adjacent rows appears as macroscopically abnormal vertical lines along the row direction.

Fifteenth Embodiment

Figure 23:
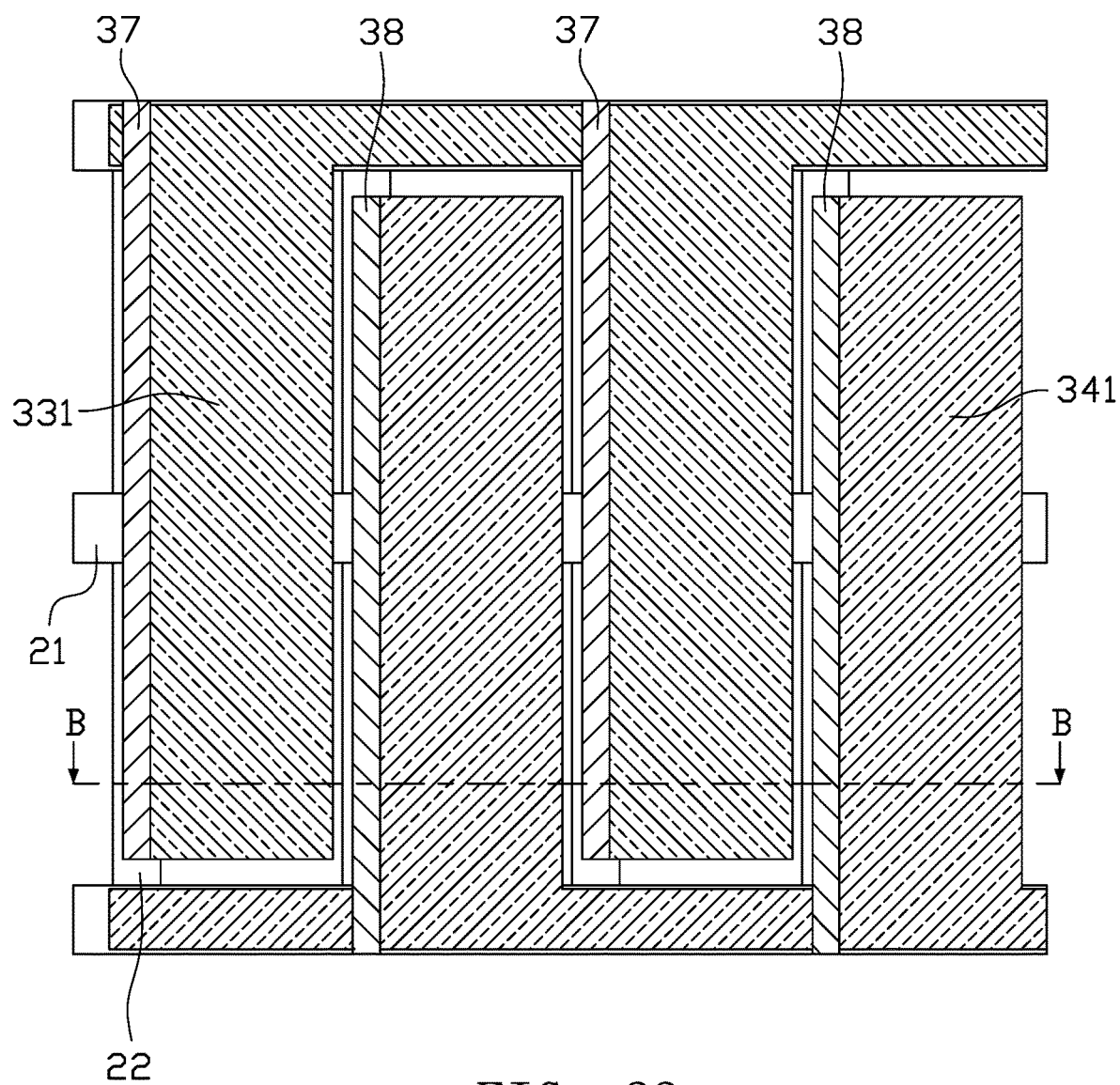
FIG. 23 is a schematic plan view showing the structure of a liquid crystal display device according to a fifteenth embodiment of the present application.

When the first bias electrode 33 and the second bias electrode 34 are made of a transparent conductive material such as ITO or IZO, the voltage waveform transmitted across the first bias electrode 33 and the second bias electrode 34 is susceptible to distortion and signal delay due to the large impedance of ITO and IZO. As shown in FIG. 23, the upper substrate 30 is further provided with a plurality of first metal strips 37 and a plurality of second metal strips 38. The plurality of first metal strips 37 are parallel to the plurality of first electrode strips 331 and are electrically connected to the plurality of first electrode strips 331, respectively. The plurality of second metal strips 38 are parallel to the plurality of second electrode strips 341 and are electrically connected to the plurality of second electrode strips 341, respectively.

The plurality of first metal strips 37 and the plurality of second metal strips 38 may be made of a metal having a low resistivity such as Mo, Al, Au, Ag, or Cu. These metal strips 37, 38 correspond to the positions of the black matrix 31, and each of the metal strips 37 (or 38) can be electrically connected to the electrode strips 331 (or 341) at the open areas via partial contact.

By providing the first metal strips 37 and the second metal strips 38 electrically connected to the first bias electrode 33 and the second bias electrode 34, the resistance of the metal strips 37, 38 is small, and the conduction capability is strong, such that the impedance of the first bias electrode 33 and the second bias electrode 34 are greatly reduced, thereby solving the signal delay problem on the first bias electrode 33 and the second bias electrode 34, so as to prevent waveform distortion or signal attenuation from causing abnormal image quality.

In this embodiment, the metal strips 37, 38 and the first electrode strips 331 and the second electrode strips 341 all extend in the vertical direction, i.e., along the direction of the data lines 22.

The specific positions of the metal strips 37, 38 in the upper substrate 30 are not limited, and can be adjusted as needed, as shown in FIG. 24a to FIG. 24d.

Figure 24A:
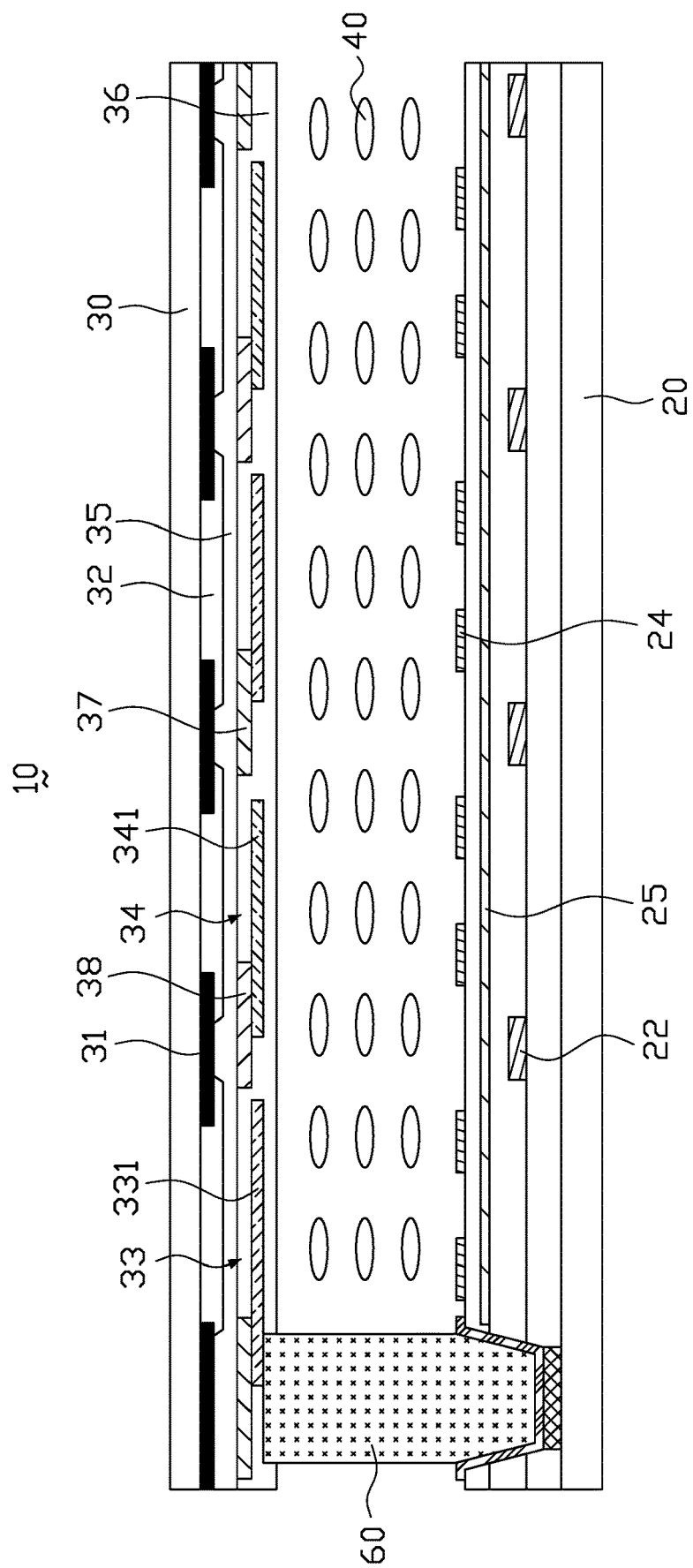
FIGS. 24a to 24d are schematic views showing different cross-sectional structures of the liquid crystal display device of FIG. 23 along the line B-B.

As shown in FIG. 24a, the upper substrate 30 is provided with a black matrix 31, a color resist layer 32, a first overcoat layer 35, first metal strips 37, second metal strips 38, a first bias electrode 33, a second bias electrode 34 and a second overcoat layer 36 on the side facing the liquid crystal layer 40. The first overcoat layer 35 covers the black matrix 31 and the color resist layer 32. The first metal strips 37, the second metal strips 38, the first bias electrode 33 and the second bias electrode 34 are then sequentially formed on the first overcoat layer 35. The first metal strips 37, the second metal strips 38, the first bias electrode 33 and the second bias electrode 34 are covered by the second overcoat layer 36.

Figure 24B:
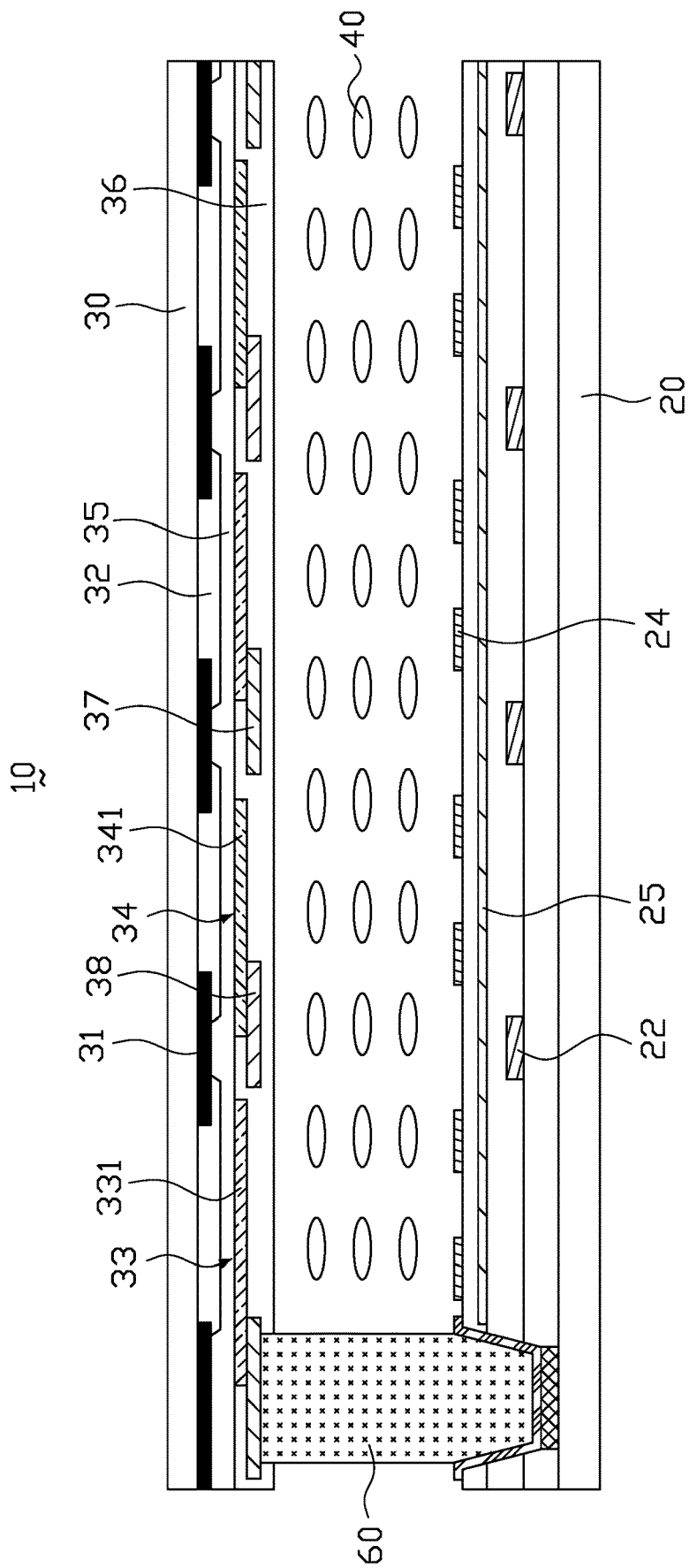

As shown in FIG. 24b, the upper substrate 30 is provided with a black matrix 31, a color resist layer 32, a first overcoat layer 35, a first bias electrode 33, a second bias electrode 34, first metal strips 37, second metal strips 38 and a second overcoat layer 36 on the side facing the liquid crystal layer 40. The first overcoat layer 35 covers the black matrix 31 and the color resist layer 32. The first bias electrode 33, the second bias electrode 34, the first metal strips 37 and the second metal strips 38 are then sequentially formed on the first overcoat layer 35. The first bias electrode 33, the second bias electrode 34, the first metal strips 37 and the second metal strips 38 are covered by the second planar layer 36.

Figure 24C:
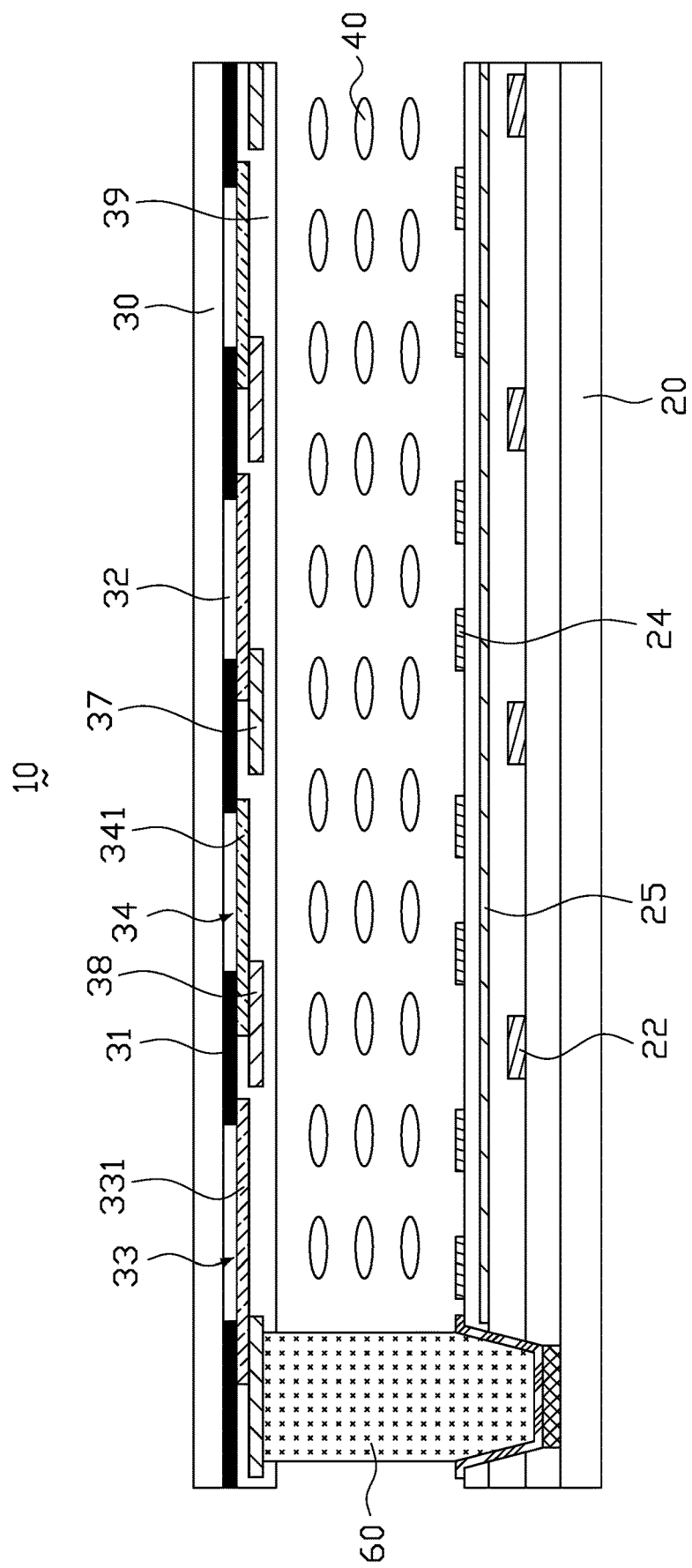

As shown in FIG. 24c, the upper substrate 30 is provided with a black matrix 31, a color resist layer 32, a first bias electrode 33, a second bias electrode 34, first metal strips 37, second metal strips 38 and an overcoat layer 39 on the side facing the liquid crystal layer 40. On the black matrix 31 and the color resist layer 32, the first bias electrode 33, the second bias electrode 34, the first metal strips 37 and the second metal strips 38 are formed and covered by the overcoat layer 39.

Figure 24D:
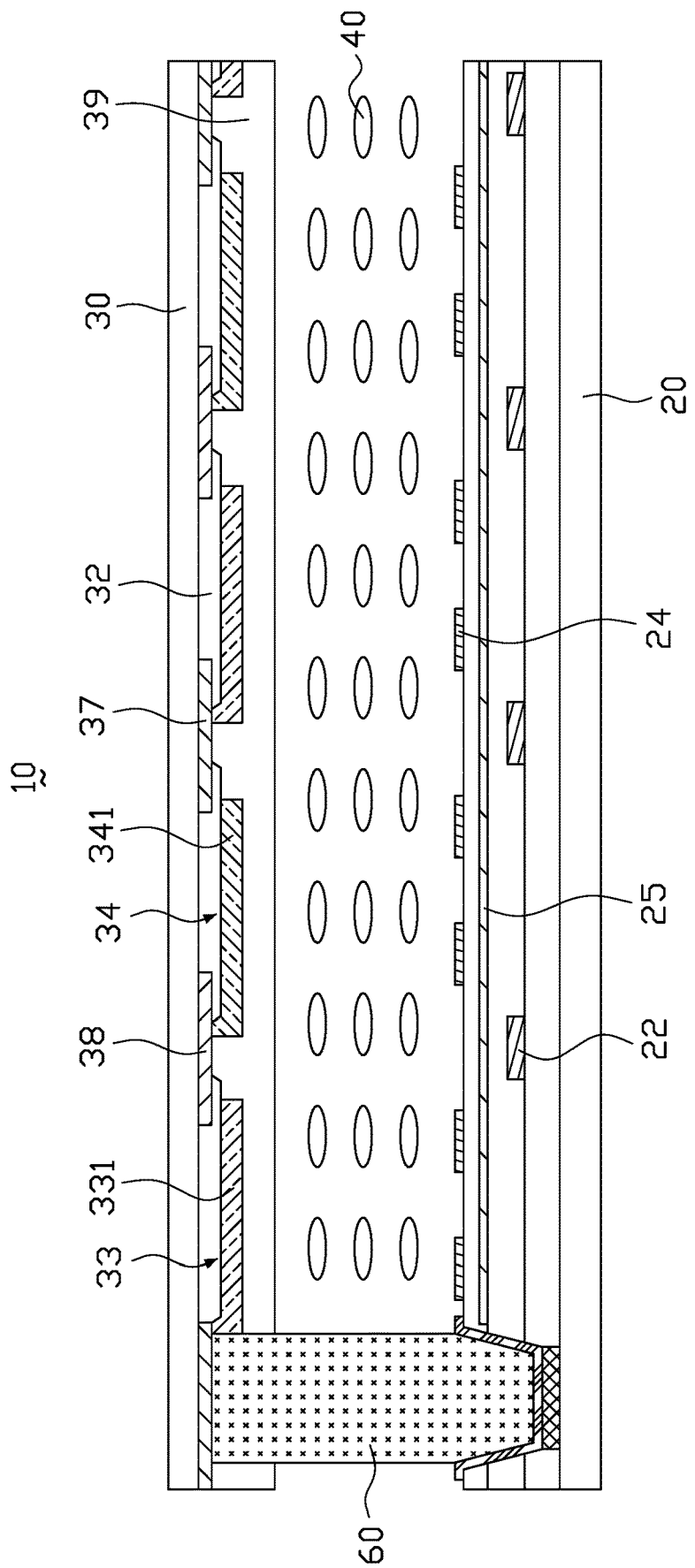

As shown in FIG. 24d, the upper substrate 30 is provided with a black metal, a color resist layer 32, a first bias electrode 33, a second bias electrode 34 and an overcoat layer 39 on the side facing the liquid crystal layer 40. The black metal is formed into first metal strips 37 and second metal strips 38, and the first metal strips 37 and the second metal strips 38 are used as a black matrix (BM) in the vertical direction, thereby saving the production steps and costs of the original black matrix (BM). On the black metal and the color resist layer 32, the first bias electrode 33 and the second bias electrode 34 are formed and covered by the overcoat layer 39.

Sixteenth Embodiment

Figure 25:
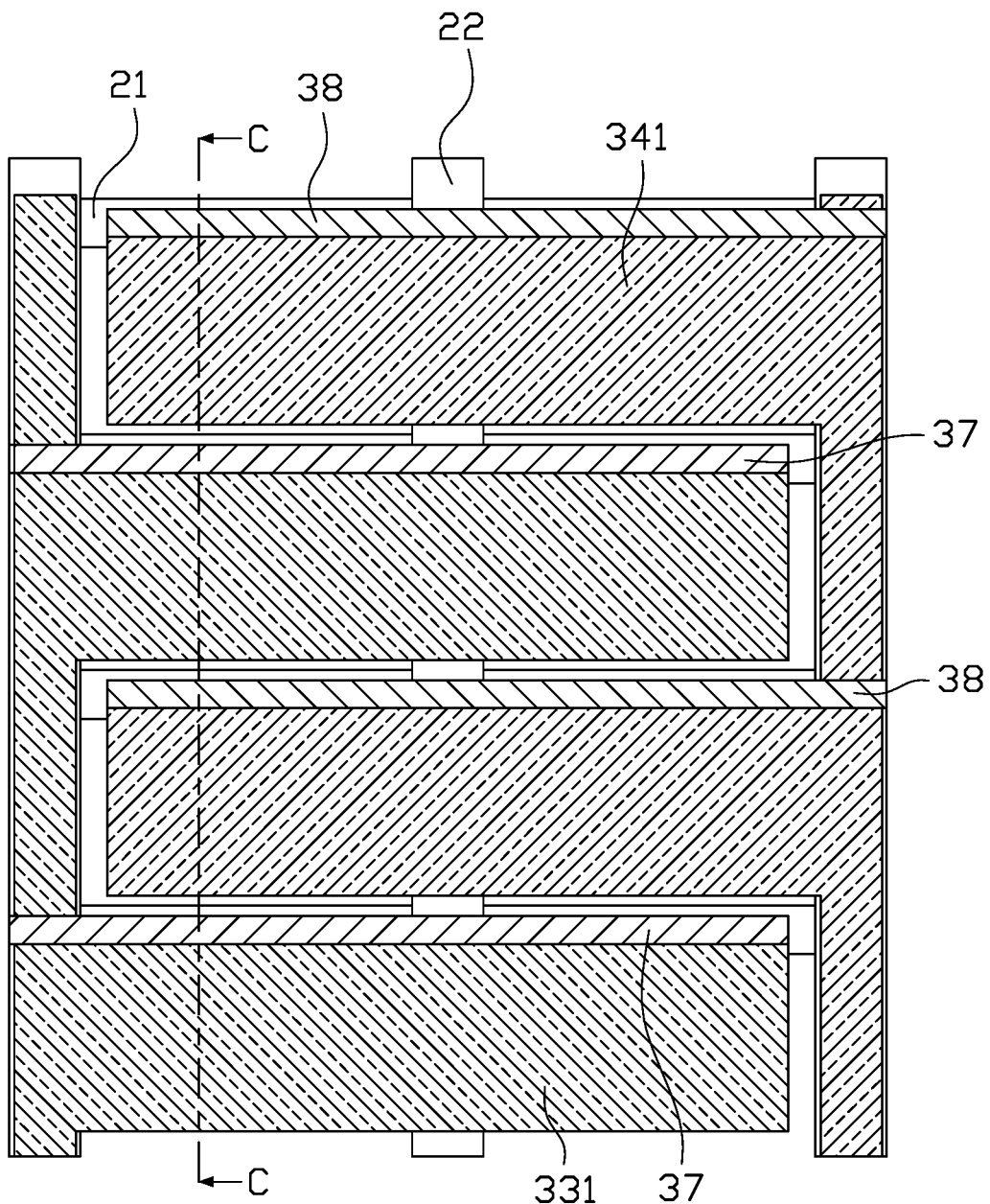
FIG. 25 is a schematic plan view showing the structure of a liquid crystal display device according to a sixteenth embodiment of the present application.

As shown in FIG. 25, in the embodiment, the upper substrate 30 is further provided with a plurality of first metal strips 37 and a plurality of second metal strips 38. The plurality of first metal strips 37 are parallel to the plurality of first electrode strips 331 and are electrically connected to the plurality of first electrode strips 331, respectively. The plurality of second metal strips 38 are parallel to the plurality of second electrode strips 341 and are electrically connected to the plurality of second electrode strips 341, respectively.

The plurality of first metal strips 37 and the plurality of second metal strips 38 may be made of a metal having a low resistivity such as Mo, Al, Au, Ag, or Cu. These metal strips 37, 38 correspond to the positions of the black matrix 31, and each of the metal strips 37 (or 38) can be electrically connected to the electrode strips 331 (or 341) at the open areas via partial contact.

In this embodiment, the metal strips 37, 38 and the first electrode strips 331 and the second electrode strips 341 all extend in the horizontal direction, i.e., along the direction of the scanning lines 21.

The specific positions of the metal strips 37 and 38 in the upper substrate 30 are not limited, and can be adjusted as needed, as shown in FIG. 26a to FIG. 26d.

Figure 26A:
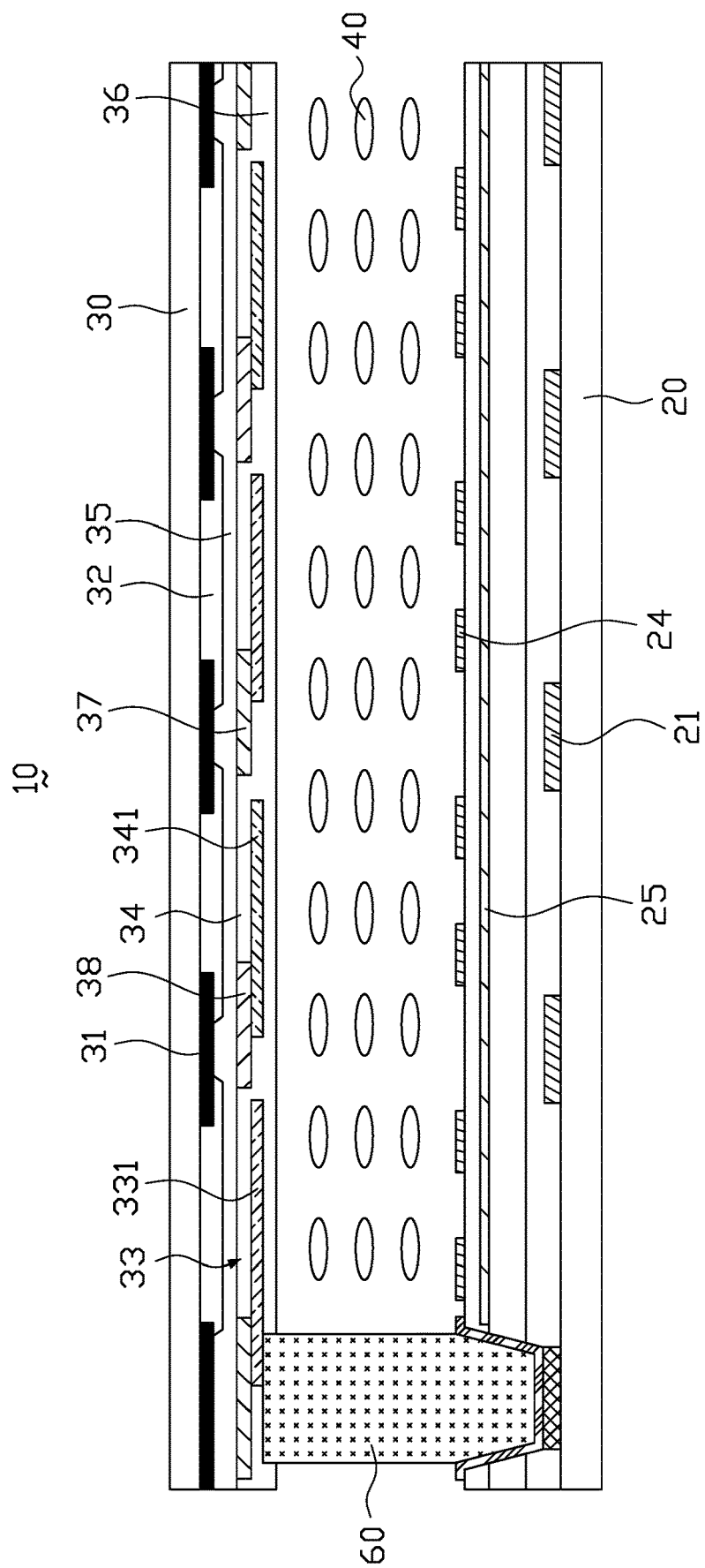
FIGS. 26a to 26d are schematic views showing different cross-sectional structures of the liquid crystal display device of FIG. 25 along the line C-C.

As shown in FIG. 26a, the upper substrate 30 is provided with a black matrix 31, a color resist layer 32, a first overcoat layer 35, first metal strips 37, second metal strips 38, a first bias electrode 33, a second bias electrode 34 and a second overcoat layer 36 on the side facing the liquid crystal layer 40. The first overcoat layer 35 covers the black matrix 31 and the color resist layer 32. The first metal strips 37, the second metal strips 38, the first bias electrode 33 and the second bias electrode 34 are then sequentially formed on the first overcoat layer 35. The first metal strips 37, the second metal strips 38, the first bias electrode 33 and the second bias electrode 34 are covered by the second overcoat layer 36.

Figure 26B:
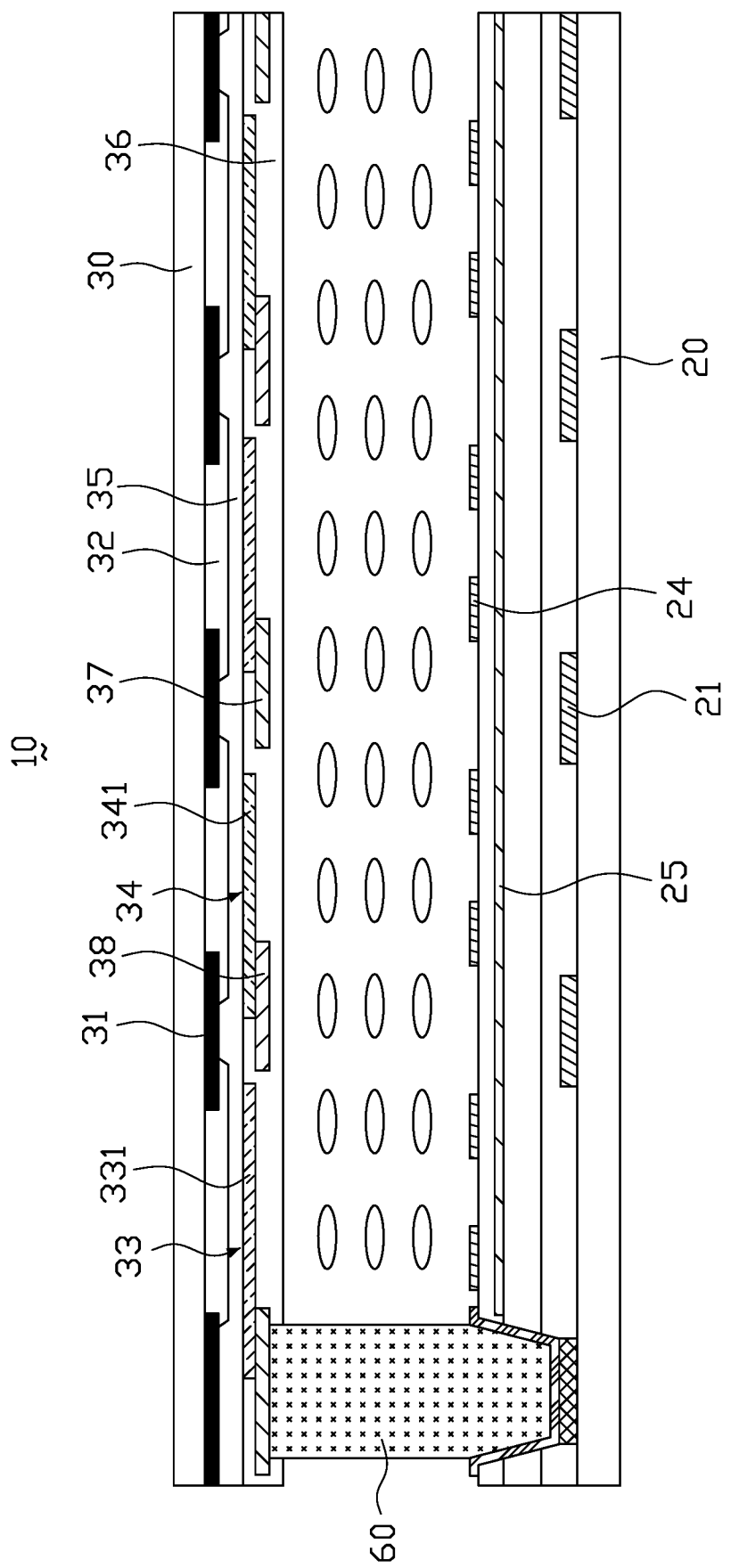

As shown in FIG. 26b, the upper substrate 30 is provided with a black matrix 31, a color resist layer 32, a first overcoat layer 35, a first bias electrode 33, a second bias electrode 34, first metal strips 37, second metal strips 38 and a second overcoat layer 36 on the side facing the liquid crystal layer 40. The first overcoat layer 35 covers the black matrix 31 and the color resist layer 32. The first bias electrode 33, the second bias electrode 34, the first metal strips 37 and the second metal strips 38 are then sequentially formed on the first overcoat layer 35. The first bias electrode 33, the second bias electrode 34, the first metal strips 37 and the second metal strips 38 are covered by the second planar layer 36.

Figure 26C:
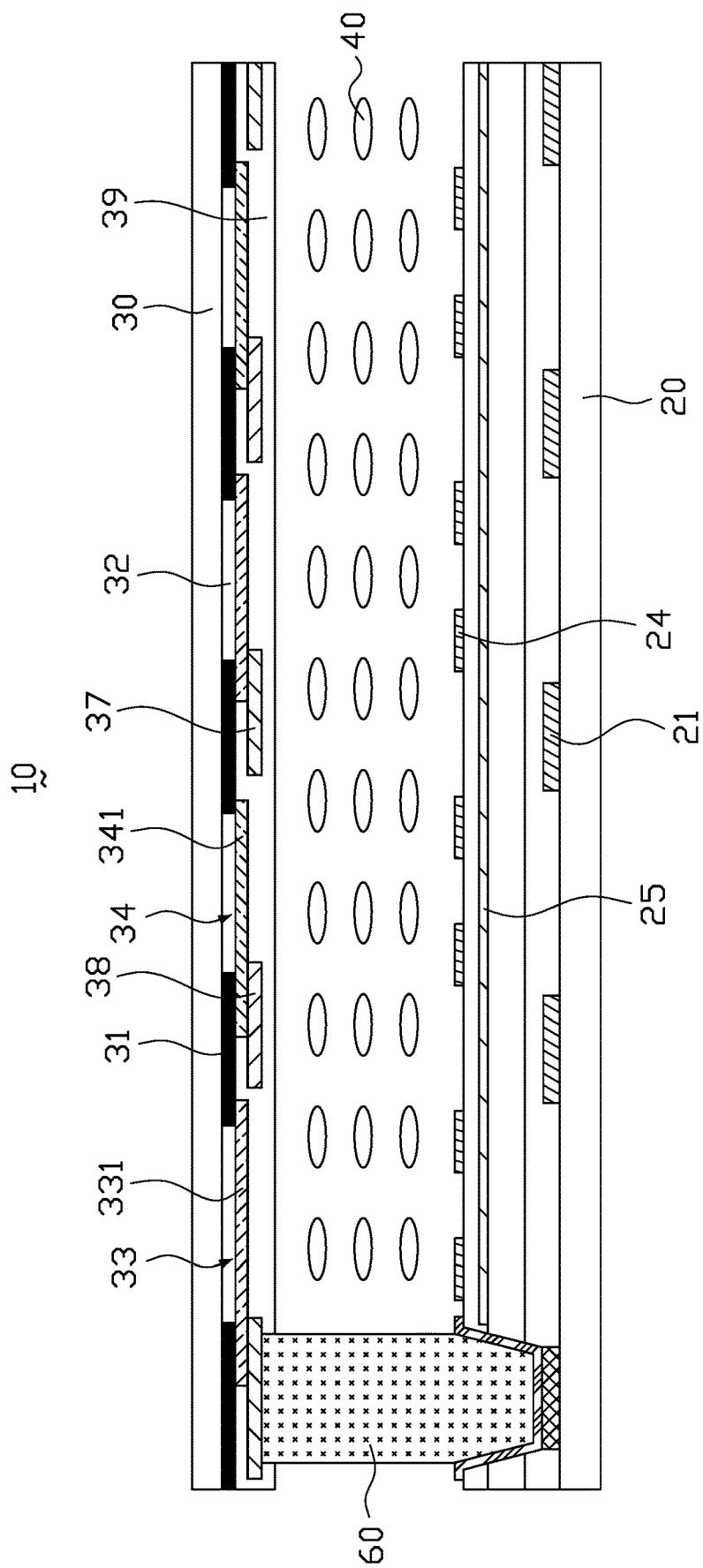

As shown in FIG. 26c, the upper substrate 30 is provided with a black matrix 31, a color resist layer 32, a first bias electrode 33, a second bias electrode 34, first metal strips 37, second metal strips 38 and an overcoat layer 39 on the side facing the liquid crystal layer 40. On the black matrix 31 and the color resist layer 32, the first bias electrode 33, the second bias electrode 34, the first metal strips 37 and the second metal strips 38 are formed and covered by the overcoat layer 39.

Figure 26D:
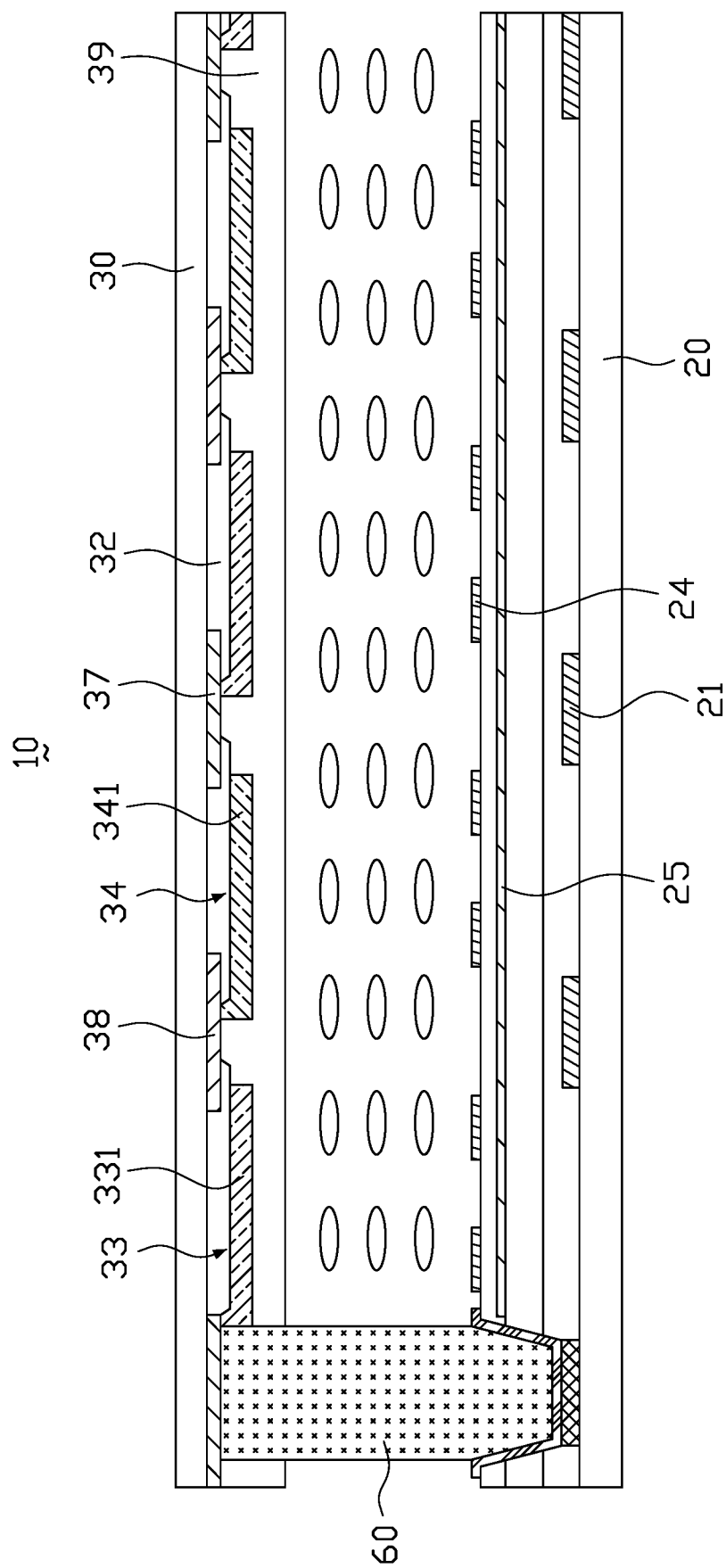

As shown in FIG. 26d, the upper substrate 30 is provided with a black metal, a color resist layer 32, a first bias electrode 33, a second bias electrode 34 and an overcoat layer 39 on the side facing the liquid crystal layer 40. The black metal is formed into first metal strips 37 and second metal strips 38, and the first metal strips 37 and the second metal strips 38 are used as a black matrix (BM) in the vertical direction, thereby saving the production steps and costs of the original black matrix (BM). On the black metal and the color resist layer 32, the first bias electrode 33 and the second bias electrode 34 are formed and covered by the overcoat layer 39.

Seventeenth Embodiment

Figure 27:
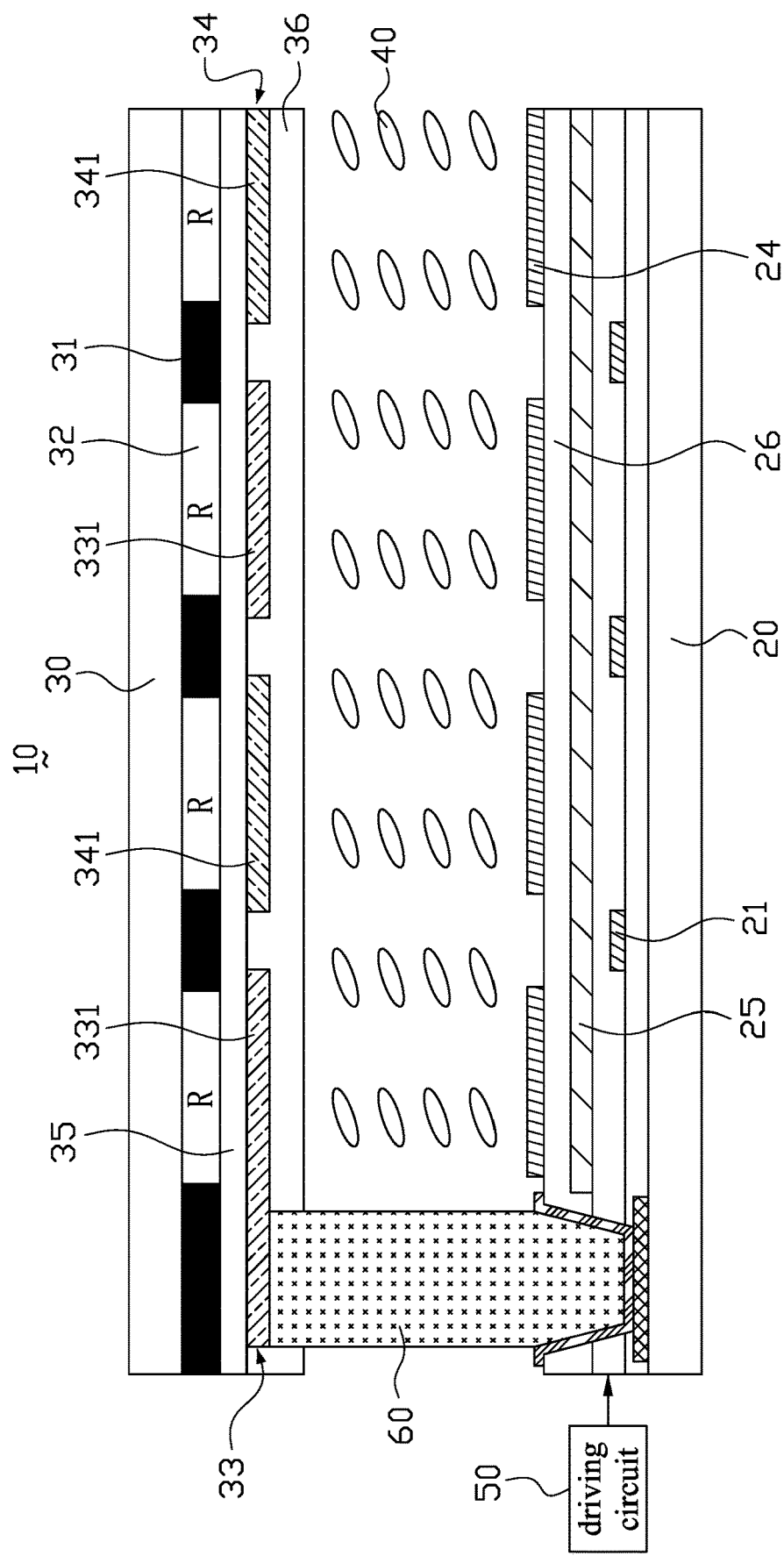
FIG. 27 is a partial cross-sectional view showing a liquid crystal display device according to a seventeenth embodiment of the present application.
Figure 28:
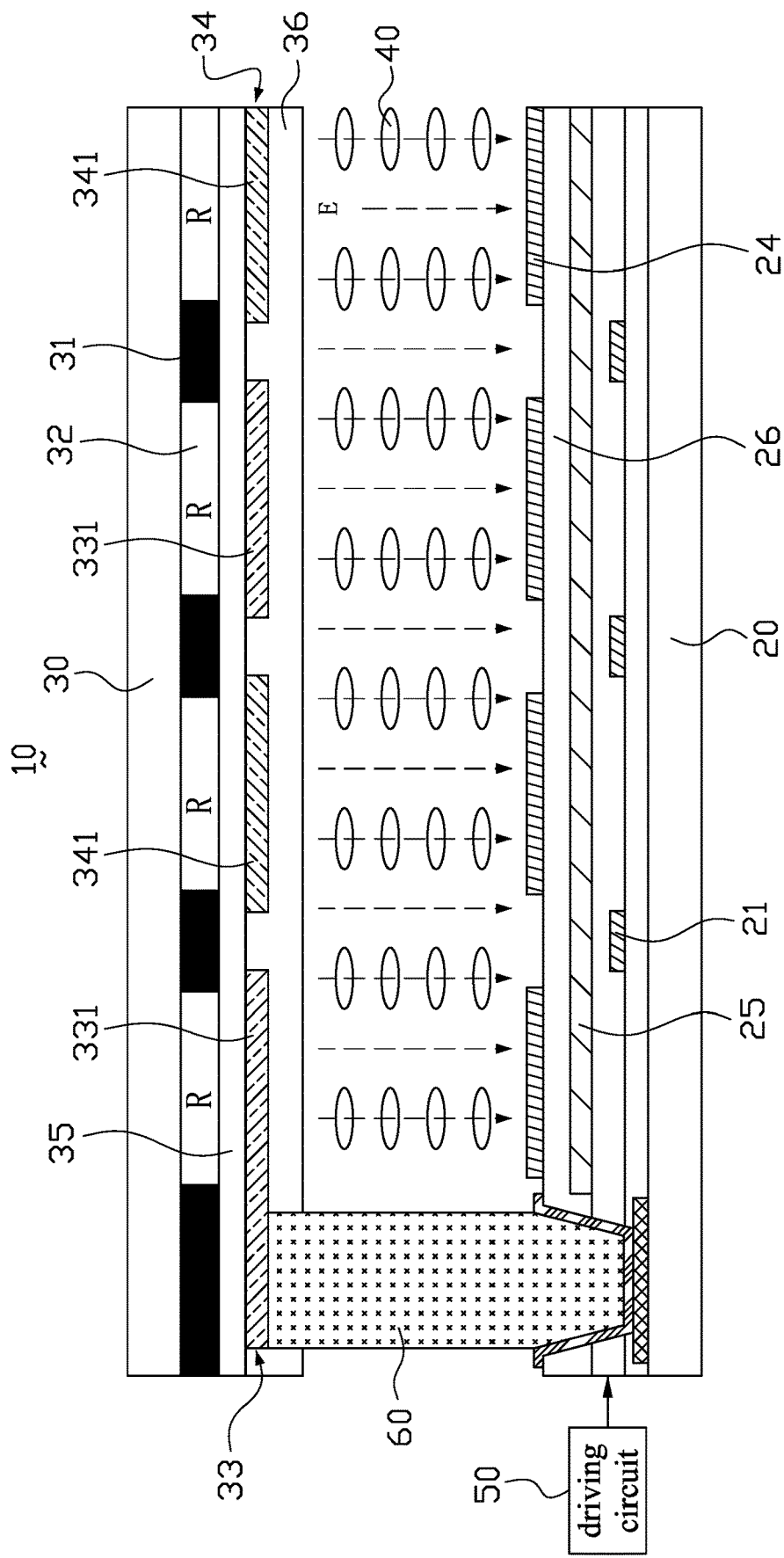
FIG. 28 is a schematic cross-sectional view of the liquid crystal display device of FIG. 27 in a wide viewing angle.

Referring to FIG. 27 and FIG. 28, the liquid crystal display device provided in this embodiment is different from the above-described first embodiment in that the liquid crystal layer 40 in this embodiment employs negative liquid crystal molecules. With the advancement of technology, the performance of negative liquid crystals has been significantly improved, and applications have become widespread. In this embodiment, as shown in FIG. 27, in the initial state, the negative liquid crystal molecules in the liquid crystal layer 40 have a large initial pretilt angle with respect to the substrates 20, 30, that is, in the initial state, the negative liquid crystal molecules are tilted with respect to the substrate. 20, 30.

Narrow viewing angle mode: Referring to FIG. 27, in this embodiment, when the voltage differences between the applied first bias electrode 33 and the common electrode 25 and between the applied second bias electrode 34 and the common electrode 25 are both less than a preset value (e.g., less than 1 V), since the voltage differences between the first bias electrode 33 and the common electrode 25 and between the second bias electrode 34 and the common electrode 25 are small, the tilt angle of the liquid crystal molecules in the liquid crystal layer 40 is almost not changed to remain in the tilted posture, causing the liquid crystal display device to generate light leakage from large observation angle, so that the contrast is lowered and the viewing angle is reduced in the squint direction. At this time, the liquid crystal display device achieves a narrow viewing angle display. That is, the driving manner in the narrow viewing angle mode of this embodiment is the same as the driving manner in the wide viewing angle mode of the first embodiment as described above.

Wide viewing angle mode: Referring to FIG. 28, in this embodiment, when a first alternating-current voltage is applied to the first bias electrode 33 and a second alternating-current voltage is applied to the second bias electrode 34, such that the voltage differences between the first bias electrode 33 and the common electrode 25 and between the second bias electrode 34 and the common electrode 25 are both greater than a preset value (e.g., greater than 3V). Since the voltage differences between the first bias electrode 33 and the common electrode 25 and between the second bias electrode 34 and the common electrode 25 are large, a strong vertical electric field E (as indicated by the arrows in FIG. 28) is generated in the liquid crystal cell between the lower substrate 20 and the upper substrate 30.

Since the negative liquid crystal molecules will rotate in a direction perpendicular to the electric field lines under the electric field, the negative liquid crystal molecules will tilt under the action of the vertical electric field E to cause the tilt angle between the liquid crystal molecules and the substrates 20, 30 to decrease, so that the light leakage phenomenon of the liquid crystal display device at large angle is correspondingly reduced, the contrast is increased in the squint direction, the viewing angle is increased, and the liquid crystal display device finally achieves a wide viewing angle display. That is, the driving manner in the wide viewing angle mode of this embodiment is the same as the driving manner in the narrow viewing angle mode of the first embodiment as described above.

For other structures and principles of this embodiment, reference may be made to the foregoing various embodiments, and details are not described herein again.

Eighteenth Embodiment

Figure 29A:
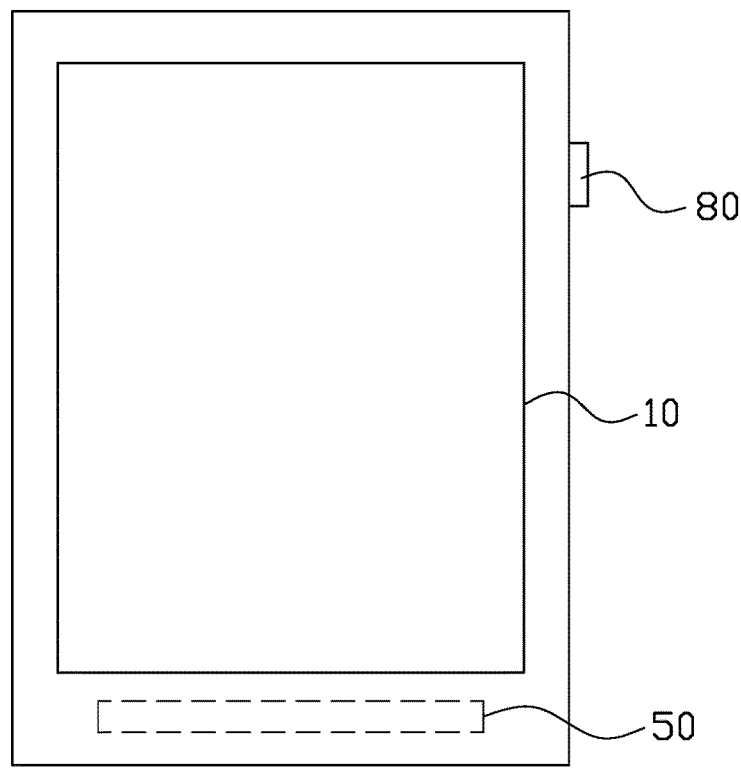
FIGS. 29a and 29b are schematic plan views showing a liquid crystal display device according to an eighteenth embodiment of the present application.
Figure 29B:
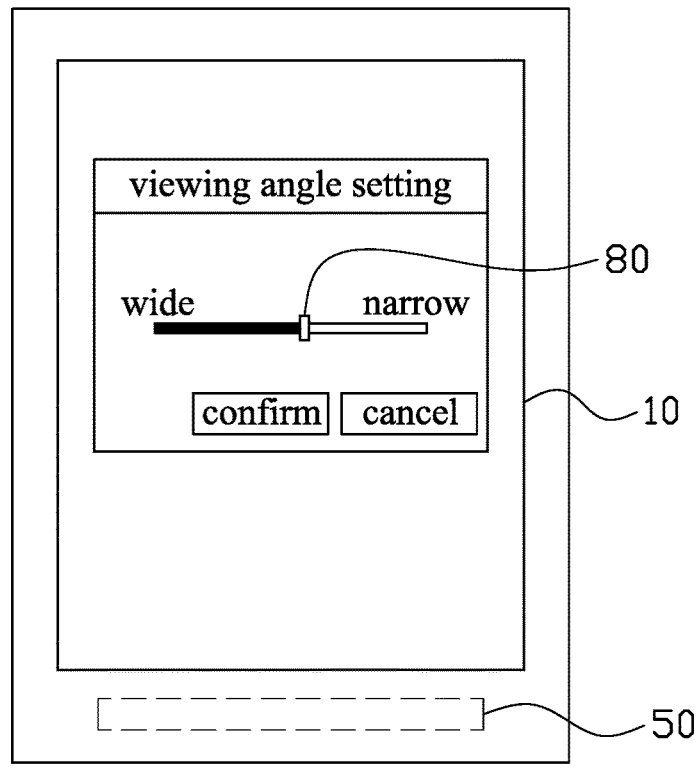

Referring to FIG. 29a and FIG. 29b, in order to facilitate switching between wide and narrow viewing angles, the liquid crystal display device further includes a switch button 80 for switching different viewing angle modes of the liquid crystal display device. The switch button 80 can be a mechanical button (as shown in FIG. 29a) or a virtual button (as shown in FIG. 29b, set by software control or by an application). When the user needs to switch the wide and narrow viewing angles, the switch button 80 can be operated to issue a viewing angle switching request to the liquid crystal display device, and finally the driving circuit 50 controls the voltage signals applied to the first bias electrode 33 and the second bias electrode 34 of the upper substrate 30, and at the same time, the inversion driving of the lower substrate 20 is controlled to realize the switching of the wide and narrow viewing angles, so that the user can freely switch between wide and narrow viewing angles according to different anti-spying requirements. Thus, the liquid crystal display device of the embodiments of the present application has good operational flexibility and convenience.

The above are only the preferred embodiments of the present application, and are not intended to limit the present application. Any modifications, equivalents, improvements, etc., which are within the spirit and scope of the present application, should be included in the scope of the present application.

INDUSTRIAL APPLICABILITY

The driving method provided in the embodiments of the present application can realize the switching between wide and narrow viewing angles by the arrangement of bias electrodes in the upper substrate and by applying voltage signals to the bias electrodes, and further by the inversion driving of the lower substrate, so as to solve the problem of vertical or horizontal dark lines existing in the prior art and improve the display quality of the display device.

What is claimed is:

1. A driving method for a liquid crystal display device capable of switching between a wide viewing angle and a narrow viewing angle, wherein the liquid crystal display device comprises a lower substrate, an upper substrate and a liquid crystal layer between the lower substrate and the upper substrate; the lower substrate is provided with scanning lines, data lines, pixel electrodes and a common electrode, a plurality of scanning lines and a plurality of data lines are insulated from each other to define a plurality of pixel units on the lower substrate; the upper substrate is provided with a first bias electrode and a second bias electrode, the first bias electrode comprises a plurality of first electrode strips electrically connected together, the second bias electrode comprises a plurality of second electrode strips electrically connected together, the plurality of first electrode strips and the plurality of second electrode strips are mutually inserted with each other, wherein the driving method comprises:

in a first viewing angle mode, applying a direct-current common voltage to the common electrode, outputting driving voltages to the pixel units to achieve display of different gray scales through different voltage values, and applying a voltage signal to each of the first bias electrode and the second bias electrode such that the voltage differences between the first bias electrode and the common electrode, and between the second bias electrode and the common electrode are both less than a preset value;

in a second viewing angle mode, applying a direct-current common voltage to the common electrode, outputting driving voltages to the pixel units to achieve display of different gray scales through different voltage values, applying a first alternating-current voltage to the first bias electrode, and applying a second alternating-current voltage to the second bias electrode such that the voltage differences between the first bias electrode and the common electrode, and between the second bias electrode and the common electrode are both greater than the preset value;

wherein in the second viewing angle mode, the pixel units covered by each first electrode strip of the first bias electrode have alternating positive and negative polarities, and the pixel units covered by each second electrode strip also have alternating positive and negative polarities.

2. The driving method according to claim 1, wherein the plurality of first electrode strips and the plurality of second electrode strips all extend in a horizontal direction; and in the second viewing angle mode, the polarity of the driving voltages outputted to the pixel units adopts column inversion.

3. The driving method according to claim 2, wherein in the second viewing angle mode, the first alternating-current voltage applied to the first bias electrode and the second alternating-current voltage applied to the second bias electrode have opposite polarities relative to the direct-current common voltage of the common electrode.

4. The driving method according to claim 3, wherein in the second viewing angle mode, the first alternating-current voltage applied to the first bias electrode and the second alternating-current voltage applied to the second bias electrode are both square waves, and are in a mirrored relationship relative to the direct-current common voltage of the common electrode.

5. The driving method according to claim 1, wherein the plurality of first electrode strips and the plurality of second electrode strips all extend in a vertical direction; and in the second viewing angle mode, the polarity of the driving voltages outputted to the pixel units adopts row inversion.

6. The driving method according to claim 5, wherein in the second viewing angle mode, the first alternating-current voltage applied to the first bias electrode and the second alternating-current voltage applied to the second bias electrode have opposite polarities relative to the direct-current common voltage of the common electrode.

7. The driving method according to claim 6, wherein in the second viewing angle mode, the first alternating-current voltage applied to the first bias electrode and the second alternating-current voltage applied to the second bias electrode are both square waves, and are in a mirrored relationship relative to the direct-current common voltage of the common electrode.

8. The driving method according to claim 1, wherein the plurality of first electrode strips and the plurality of second electrode strips all extend in a horizontal direction or in a vertical direction; and in the second viewing angle mode, the polarity of the driving voltages outputted to the pixel units adopts dot inversion.

9. The driving method according to claim 8, wherein in the second viewing angle mode, the first alternating-current voltage applied to the first bias electrode and the second alternating-current voltage applied to the second bias electrode have the same polarity relative to the direct-current common voltage of the common electrode.

10. The driving method according to claim 9, wherein in the second viewing angle mode, the first alternating-current voltage applied to the first bias electrode and the second alternating-current voltage applied to the second bias electrode have the same polarity relative to the direct-current common voltage of the common electrode.

11. The driving method according to claim 1, wherein in the second viewing angle mode, the frequency of the first alternating-current voltage applied to the first bias electrode and the frequency of the second alternating-current voltage applied to the second bias electrode are both ½ of the frame rate of the liquid crystal display device, and the polarity of the driving voltage outputted to each pixel unit is inverted once every two frames.

12. The driving method according to claim 1, wherein in the second viewing angle mode, the frequency of the first alternating-current voltage applied to the first bias electrode and the frequency of the second alternating-current voltage applied to the second bias electrode are both ¼ of the frame rate of the liquid crystal display device, and the polarity of the driving voltage outputted to each pixel unit is inverted once every frame or every four frames.

13. The driving method according to claim 1, wherein in the first viewing angle mode, the voltage signal applied to each of the first bias electrode and the second bias electrode is a direct-current voltage signal identical to the direct-current common voltage of the common electrode, such that the voltage differences between the first bias electrode and the common electrode, and between the second bias electrode and the common electrode are each zero.

14. The driving method according to claim 1, wherein the liquid crystal layer adopts positive liquid crystal molecules, the first viewing angle mode is a wide viewing angle mode, and the second viewing angle mode is a narrow viewing angle mode.

15. The driving method according to claim 1, wherein the liquid crystal layer adopts negative liquid crystal molecules, the first viewing angle mode is a narrow viewing angle mode, and the second viewing angle mode is a wide viewing angle mode.

16. The driving method according to claim 1, wherein the upper substrate is further provided with a plurality of first metal strips and a plurality of second metal strips; the plurality of first metal strips are parallel to the plurality of first electrode strips and electrically connected to the plurality of first electrode strips, respectively; the plurality of second metal strips are parallel to the plurality of second electrode strips and electrically connected to the plurality of second electrode strips, respectively.

17. The driving method according to claim 1, wherein the liquid crystal display device is provided with a switch button for switching different viewing angle modes of the liquid crystal display device.

\* \* \* \* \*